US012334085B2

(12) United States Patent
Kordon et al.

(10) Patent No.: US 12,334,085 B2
(45) **Date of Patent: *Jun. 17, 2025**

(54) LAYERED CODING AND DATA STRUCTURE FOR COMPRESSED HIGHER-ORDER AMBISONICS SOUND OR SOUND FIELD REPRESENTATIONS

(71) Applicant: DOLBY INTERNATIONAL AB, Dublin (IE)

(72) Inventors: Sven Kordon, Wunstorf (DE); Alexander Krueger, Burgdorf (DE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,871

(22) Filed: Feb. 8, 2024

(65) Prior Publication Data

US 2024/0177718 A1 May 30, 2024

Related U.S. Application Data

(60) Continuation of application No. 17/749,007, filed on May 19, 2022, now Pat. No. 11,955,130, which is a (Continued)

(30) Foreign Application Priority Data

Oct. 8, 2015 (EP) .................................... 15306591

(51) Int. Cl.
*G10L 19/00* (2013.01)
*G10L 19/008* (2013.01)

(Continued)

(52) U.S. Cl.
CPC ............ *G10L 19/008* (2013.01); *G10L 19/24* (2013.01); *G10L 19/167* (2013.01)

(58) Field of Classification Search
CPC ......... G10L 15/02; G10L 25/78; G10L 19/00; G10L 19/167; G10L 19/24; G10L 19/008; G10L 21/038; G06F 3/16
See application file for complete search history.

(56) References Cited

U.S. PATENT DOCUMENTS

| | | | |
|---|---|---|---|
| 7,904,293 | B2 | 3/2011 | Wang |
| 8,494,865 | B2 | 7/2013 | Fuchs |

(Continued)

FOREIGN PATENT DOCUMENTS

| | | | |
|---|---|---|---|
| CN | 102547549 | B | 7/2012 |
| CN | 104285253 | B | 1/2015 |

(Continued)

OTHER PUBLICATIONS

Hellerud, E. et al "Spatial Redundancy in Higher Order Ambisonics and Its Use for Low Delay Lossless Compression" IEEE International Conference on Acoustics, Speech and Signal Processing, Apr. 19, 2009, pp. 269-272.

(Continued)

*Primary Examiner* — Vu B Hang

(57) ABSTRACT

The present document relates to a method of layered encoding of a frame of a compressed higher-order Ambisonics, HOA, representation of a sound or sound field. The compressed HOA representation comprises a plurality of transport signals. The method comprises assigning the plurality of transport signals to a plurality of hierarchical layers, the plurality of layers including a base layer and one or more hierarchical enhancement layers, generating, for each layer, a respective HOA extension payload including side information for parametrically enhancing a reconstructed HOA representation obtainable from the transport signals assigned to the respective layer and any layers lower than the respective layer, assigning the generated HOA extension payloads to their respective layers, and signaling the generated HOA (Continued)

extension payloads in an output bitstream. The present document further relates to a method of decoding a frame of a compressed HOA representation of a sound or sound field, an encoder and a decoder for layered coding of a compressed HOA representation, and a data structure representing a frame of a compressed HOA representation of a sound or sound field.

7 Claims, 7 Drawing Sheets

Related U.S. Application Data continuation of application No. 16/925,336, filed on Jul. 10, 2020, now Pat. No. 11,373,661, which is a division of application No. 15/763,830, filed as application No. PCT/EP2016/073971 on Oct. 7, 2016, now Pat. No. 10,714,099.

(60) Provisional application No. 62/361,863, filed on Jul. 13, 2016.

(51) Int. Cl.
*G10L 19/24* (2013.01)
*G10L 19/16* (2013.01)

(56) References Cited

U.S. PATENT DOCUMENTS

| | | | | |
|---|---|---|---|---|
| 8,645,145 | B2 | 2/2014 | Subbaraman | |
| 11,373,661 | B2 * | 6/2022 | Kordon | G10L 19/008 |
| 2009/0171672 | A1 | 7/2009 | Philippe | |
| 2012/0155653 | A1 | 6/2012 | Jax | |
| 2014/0303762 | A1 | 10/2014 | Johnson | |
| 2015/0154965 | A1 | 6/2015 | Wuebbolt | |
| 2015/0194157 | A1 | 7/2015 | Ubale | |
| 2015/0213803 | A1 * | 7/2015 | Peters | G10L 19/008 704/500 |
| 2015/0248889 | A1 | 9/2015 | Dickins et al. | |

FOREIGN PATENT DOCUMENTS

| | | | |
|---|---|---|---|
| EP | 2922057 | A1 | 9/2015 |
| JP | 2003241799 | A | 8/2003 |
| JP | 2013535023 | A | 9/2013 |
| KR | 20120070521 | A | 6/2012 |
| KR | 20160013133 | A | 2/2016 |
| SA | 518391264 | B1 | 10/2021 |
| WO | 2010003556 | A1 | 1/2010 |
| WO | 2010103854 | A1 | 9/2012 |
| WO | 2014/195190 | A1 | 12/2014 |
| WO | 2015140292 | A1 | 9/2015 |
| WO | 2015140293 | A1 | 9/2015 |

OTHER PUBLICATIONS

ISO/IEC JTC1/SC29/WG11 23008-3:2015(E). Information technology—High efficiency coding and media delivery in heterogeneous environments—Part 3: 3D audio, Feb. 2015.

ISO/IEC JTC1/SC29/WG11 23008-3:2015/PDAM3. Information technology—High efficiency coding and media delivery in heterogeneous environments—Part 3: 3D audio, Amendment 3: MPEG-H 3D Audio Phase 2, Jul. 2015.

Sen, D. et al "Thoughts on the Scalable/Layered Coding Technology for the HOA Signal" ISO/IEC JTC1/SC29/WG11 MPEG2014/M35160, Oct. 2014, Strasbourg, France.

* cited by examiner

LAYERED CODING AND DATA STRUCTURE FOR COMPRESSED HIGHER-ORDER AMBISONICS SOUND OR SOUND FIELD REPRESENTATIONS

CROSS-REFERENCE TO RELATED APPLICATIONS

This application is a continuation of U.S. patent application Ser. No. 17/749,007, filed May 19, 2022, which is a continuation of U.S. patent application Ser. No. 16/925,336, filed Jul. 10, 2020, now U.S. Pat. No. 11,373,661 issued on Jun. 28, 2022, which is a divisional of U.S. patent application Ser. No. 15/763,830, filed on Mar. 27, 2018, now U.S. Pat. No. 10,714,099 issued on Jul. 14, 2020, which is the U.S. National Stage of PCT/EP2016/073971, filed Oct. 7, 2016, which claims priority to U.S. Provisional Application No. 62/361,863, filed Jul. 13, 2016 and European Patent Application No. 15306591.7 filed on Oct. 8, 2015, each of which is incorporate by reference in its entirety.

TECHNICAL FIELD

The present document relates to methods and apparatus for layered audio coding. In particular, the present document relates to methods and apparatus for layered audio coding of frames of compressed Higher-Order Ambisonics (HOA) sound (or sound field) representations. The present document further relates to data structures (e.g., bitstreams) for representing frames of compressed HOA sound (or sound field) representations.

BACKGROUND

In the current definition of HOA layered coding, side information for the HOA decoding tools Spatial Signal Prediction, Sub-band Directional Signal Synthesis and Parametric Ambience Replication (PAR) Decoder is created to enhance a specific HOA representation. Namely, in the current definition of the layered HOA coding the provided data only properly extends the HOA representation of the highest layer (e.g., the highest enhancement layer). For the lower layers including the base layer these tools do not enhance the partially reconstructed HOA representation properly.

The tools Sub-band Directional Signal Synthesis and Parametric Ambience Replication Decoder are specifically designed for low data rates, where only a few transport signals are available. However, in HOA layered coding proper enhancement of (partially) reconstructed HOA representations is not possible especially for the low bitrate layers, such as the base layer. This clearly is undesirable from the point of view of sound quality at low bitrates.

Additionally, it has been found that the conventional way of treating the encoded V-vector elements for the vector based signals does not result in appropriate decoding if a CodedVVecLength equal to one is signaled in the HOADecoderConfig( ) (i.e., if the vector coding mode is active). In this vector coding mode the V-vector elements are not transmitted for HOA coefficient indices that are included in the set of ContAddHoaCoeff. This set includes all HOA coefficient indices AmbCoeffIdx[i] that have an AmbCoefTransitionState equal to zero. Conventionally, there is no need to also add a weighted V-vector signal because the original HOA coefficient sequence for these indices are explicitly sent (signaled). Therefore the V—vector element is set to zero for these indices.

However, in the layered coding mode the set of continuous HOA coefficient indices depends on the transport channels that are part of the currently active layer. Additional HOA coefficient indices that are sent in a higher layer may be missing in lower layers. Then the assumption that the vector signal should not contribute to the HOA coefficient sequence is wrong for the HOA coefficient indices that belong to HOA coefficient sequences included in higher layers.

As a consequence, the V-vector in layered HOA coding may not be suitable for decoding of any layers below the highest layer.

Thus, there is need for coding schemes and bitstreams that are adapted to layered coding of compressed HOA representations of a sound or sound field.

The present document addresses the above issues. In particular, methods and encoders/decoders for layered coding of frames of compressed HOA sound or sound field representations as well as data structures for representing frames of compressed HOA sound or sound field representations are described.

SUMMARY

According to an aspect, a method of layered encoding of a frame of a compressed Higher-Order Ambisonics, HOA, representation of a sound or sound field is described. The compressed HOA representation conform to the draft MPEG-H 3D Audio standard and any other future adopted or draft standards. The compressed HOA representation may include a plurality of transport signals. The transport signals may relate to monaural signals, e.g., representing either predominant sound signals or coefficient sequences of a HOA representation. The method may include assigning the plurality of transport signals to a plurality of hierarchical layers. For example, the transport signals may be distributed to the plurality of layers. The plurality of layers may include a base layer and one or more hierarchical enhancement layers. The plurality of hierarchical layers may be ordered, from the base layer, through the first enhancement layer, the second enhancement layer, and so forth, up to an overall highest enhancement layer (overall highest layer). The method may further include generating, for each layer, a respective HOA extension payload including side information (e.g., enhancement side information) for parametrically enhancing a reconstructed HOA representation obtainable from the transport signals assigned to the respective layer and any layers lower than the respective layer. The reconstructed HOA representations for the lower layers may be referred to as partially reconstructed HOA representations. The method may further include assigning the generated HOA extension payloads to their respective layers. The method may yet further include signaling the generated HOA extension payloads in an output bitstream. The HOA extension payloads may be signaled in a HOAEnhFrame( ) payload. Thus, the side information may be moved from the HOAFrame( ) to the HOAEnhFrame( ).

Configured as above, the proposed method applies layered coding to a (frame of) compressed HOA representations so as to enable high-quality decoding thereof even at low bitrates. In particular, the proposed method ensures that each layer includes a suitable HOA extension payload (e.g., enhancement side information) for enhancing a (partially) reconstructed sound representation obtained from the transport signals in any layers up to the current layer. Therein the layers up to the current layer are understood to include, for example, the base layer, the first enhancement layer, the second enhancement layer, and so forth, up to the current layer. Therein the layers up to the current layer are understood to include, for example, the base layer, the first enhancement layer, the second enhancement layer, and so forth, up to the current layer. For example, the decoder would be enabled to enhance a (partially) reconstructed sound representation obtained from the base layer, referring to the HOA extension payload assigned to the base layer. In the conventional approach, only the reconstructed HOA representation of the highest enhancement layer could be enhanced by the HOA extension payload. Thus, regardless of an actual highest usable layer (e.g., the layer below the lowest layer that has not been validly received, so that all layers below the highest usable layer and the highest usable layer itself have been validly received), a decoder would be enabled to improve or enhance a reconstructed sound representation, even though the (partially) reconstructed sound representation may be different from the complete (e.g., full) sound representation. In particular, regardless of the actual highest usable layer, it is sufficient for the decoder to decode the HOA extension payload for only a single layer (i.e., for the highest usable layer) to improve or enhance the (partially) reconstructed sound representation that is obtainable on the basis of all transport signals included in layers up to the actual highest usable layer. Decoding the HOA extension payloads of higher or lower layers is not required. On the other hand, the proposed method allows to fully take advantage of the reduction of required bandwidth that may be achieved when applying layered coding.

In embodiments, the method may further include transmitting data payloads for the plurality of layers with respective levels of error protection. The data payloads may include respective HOA extension payloads. The base layer may have highest error protection and the one or more enhancement layers may have successively decreasing error protection. Thereby, it can be ensured that at least a number of lower layers is reliably transmitted, while on the other hand reducing the overall required bandwidth by not applying excessive error protection to higher layers.

In embodiments, the HOA extension payloads may include bit stream elements for a HOA spatial signal prediction decoding tool. Additionally or alternatively, the HOA extension payloads may include bit stream elements for a HOA sub-band directional signal synthesis decoding tool. Additionally or alternatively, the HOA extension payloads may include bit stream elements for a HOA parametric ambience replication decoding tool.

In embodiments, the HOA extension payloads may have a usacExtElementType of ID_EXT_ELE_HOA_ENH_LAYER.

In embodiments, the method may further include generating a HOA configuration extension payload including bitstream elements for configuring a HOA spatial signal prediction decoding tool, a HOA sub-band directional signal synthesis decoding tool, and/or a HOA parametric ambience replication decoding tool. The HOA configuration extension payload may be included in the HOADecoderEnhConfig( ). The method may further include signaling the HOA configuration extension payload in the output bitstream.

In embodiments, the method may further include generating a HOA decoder configuration payload including information indicative of the assignment of the HOA extension payloads to the plurality of layers. The method may further include signaling the HOA decoder configuration payload in the output bitstream.

In embodiments, the method may further include determining whether a vector coding mode is active. The method may further include, if the vector coding mode is active, determining, for each layer, a set of continuous HOA coefficient indices on the basis of the transport signals assigned to the respective layer. The HOA coefficient indices in the set of continuous HOA coefficient indices may be the HOA coefficient indices included in the set ContAddHOACoeff. The method may further include generating, for each transport signal, a V-vector on the basis of the determined set of continuous HOA coefficient indices for the layer to which the respective transport signal is assigned, such that the generated V-vector includes elements for any transport signals assigned to layers higher than the layer to which the respective transport signal is assigned. The method may further include signaling the generated V-vectors in the output bitstream.

According to another aspect, a method of layered encoding of a frame of a compressed higher-order Ambisonics, HOA, representation of a sound or sound field is described. The compressed HOA representation may include a plurality of transport signals. The transport signals may relate to monaural signals, e.g., representing either predominant sound signals or coefficient sequences of a HOA representation. The method may include assigning the plurality of transport signals to a plurality of hierarchical layers. For example, the transport signals may be distributed to the plurality of layers. The plurality of layers may include a base layer and one or more hierarchical enhancement layers. The method may further include determining whether a vector coding mode is active. The method may further include, if the vector coding mode is active, determining, for each layer, a set of continuous HOA coefficient indices on the basis of the transport signals assigned to the respective layer. The HOA coefficient indices in the set of continuous HOA coefficient indices may be the HOA coefficient indices included in the set ContAddHOACoeff. The method may further include generating, for each transport signal, a V-vector on the basis of the determined set of continuous HOA coefficient indices for the layer to which the respective transport signal is assigned, such that the generated V-vector includes elements for any transport signals assigned to layers higher than the layer to which the respective transport signal is assigned. The method may further include signaling the generated V-vectors in the output bitstream.

Configured as such, the proposed method ensures that in vector coding mode a suitable V-vector is available for every transport signal belonging to layers up to the highest usable layer. In particular, the proposed method excludes the case that elements of a V-vector corresponding to transport signals in higher layers are not explicitly signaled. Accordingly, the information included in the layers up to the highest usable layer is sufficient for decoding any transport signals belonging to layers up to the highest usable layer. Thereby, there is appropriate decompression of respective reconstructed HOA representations for lower layers (low bitrate layers) even if higher layers may not have been validly received by the decoder. On the other hand, the proposed method allows to fully take advantage of the reduction of required bandwidth that may be achieved when applying layered coding.

According to another aspect, a method of decoding a frame of a compressed higher-order Ambisonics, HOA, representation of a sound or sound field, is described. The compressed HOA representation may be encoded in a plurality of hierarchical layers. The plurality of hierarchical layers may include a base layer and one or more hierarchical enhancement layers. The method may include receiving a bitstream relating to the frame of the compressed HOA representation. The method may further include extracting payloads for the plurality of layers. Each payload may include transport signals assigned to a respective layer. The method may further include determining a highest usable layer among the plurality of layers for decoding. The method may further include extracting a HOA extension payload assigned to the highest usable layer. This HOA extension payload may include side information for parametrically enhancing a (partially) reconstructed HOA representation corresponding to the highest usable layer. The (partially) reconstructed HOA representation corresponding to the highest usable layer may be obtainable on the basis of the transport signals assigned to the highest usable layer and any layers lower than the highest usable layer. The method may further include generating the (partially) reconstructed HOA representation corresponding to the highest usable layer on the basis of the transport signals assigned to the highest usable layer and any layers lower than the highest usable layer. The method may yet further include enhancing (e.g., parametrically enhancing) the (partially) reconstructed HOA representation using the side information included in the HOA extension payload assigned to the highest usable layer. As a result, an enhanced reconstructed HOA representation may be obtained.

Configured as such, the proposed method ensures that the final (e.g., enhanced) reconstructed HOA representation has optimum quality, using the available (e.g., validly received) information to the best possible extent.

In embodiments, the HOA extension payloads may include bit stream elements for a HOA spatial signal prediction decoding tool. Additionally or alternatively, the HOA extension payloads may include bit stream elements for a HOA sub-band directional signal synthesis decoding tool. Additionally or alternatively, the HOA extension payloads may include bit stream elements for a HOA parametric ambience replication decoding tool.

In embodiments, the HOA extension payloads may have a usacExtElementType of ID_EXT_ELE_HOA_ENH_LAYER.

In embodiments, the method may further include extracting a HOA configuration extension payload by parsing the bitstream. The HOA configuration extension payload may include bitstream elements for configuring a HOA spatial signal prediction decoding tool, a HOA sub-band directional signal synthesis decoding tool, and/or a HOA parametric ambience replication decoding tool.

In embodiments, the method may further include extracting HOA extension payloads respectively assigned to the plurality of layers. Each HOA extension payload may include side information for parametrically enhancing a (partially) reconstructed HOA representation corresponding to its respective assigned layer. The (partially) reconstructed HOA representation corresponding to its respective assigned layer may be obtainable from the transport signals assigned to that layer and any layers lower than that layer. The assignment of HOA extension payloads to respective layers may be known from configuration information included in the bitstream.

In embodiments, determining the highest usable layer may involve determining a set of invalid layer indices indicating layers that have not been validly received. It may further involve determining the highest usable layer as the layer that is one layer below the layer indicated by the smallest (lowest) index in the set of invalid layer indices. The base layer may have the lowest layer index (e.g., a layer index of 1), and the hierarchical enhancement layers may have successively higher layer indices. Thereby, the proposed method ensures that the highest usable layer is chosen in such a manner that all information required for decoding a (partially) reconstructed HOA representation from the highest usable layers and any layers below the highest usable layer is available.

In embodiments, determining the highest usable layer may involve determining a set of invalid layer indices indicating layers that have not been validly received. It may further involve determining a highest usable layer of a previous frame preceding the current frame. It may yet further involve determining the highest usable layer as the lower one of the highest usable layer of the previous frame and the layer that is one layer below the layer indicated by the smallest index in the set of invalid layer indices. Thereby, the highest usable layer for the current frame is chosen in such a manner that all information required for decoding a (partially) reconstructed HOA representation from the highest usable layer and any layers below the highest usable layer is available, even if the current frame has been encoded differentially with respect to the preceding frame.

In embodiments, the method may further include deciding not to perform parametric enhancement of the (partially) reconstructed HOA representation using the side information included in the HOA extension payload assigned to the highest usable layer if the highest usable layer of the current frame is lower than the highest usable layer of the previous frame and if the current frame has been coded differentially with respect to the previous frame. Thereby, the reconstructed HOA representation can be decoded without error in cases in which the current frame (including the side information included in the HOA extension payload assigned to the highest usable layer) has been encoded differentially with respect to the preceding frame.

In embodiments, the set of invalid layer indices may be determined by evaluating validity flags of the corresponding HOA extension payloads. A layer index of a given layer may be added to the set of invalid layer indices if the validity flag for the HOA extension payload assigned to the respective layer is not set. Thereby, the set of invalid layer indices can be determined in an efficient manner.

According to another aspect, a data structure (e.g., bitstream) representing a frame of a compressed higher-order Ambisonics, HOA, representation of a sound or sound field is described. The compressed HOA representation may include a plurality of transport signals. The data structure may include a plurality of HOA frame payloads corresponding to respective ones of a plurality of hierarchical layers. The HOA frame payloads may include respective transport signals. The plurality of transport signals may be assigned (e.g., distributed) to the plurality of layers. The plurality of layers may include a base layer and one or more hierarchical enhancement layers. The data structure may further include, for each layer, a respective HOA extension payload including side information for parametrically enhancing a (partially) reconstructed HOA representation obtainable from the transport signals assigned to the respective layer and any layers lower than the respective layer.

In embodiments, the HOA frame payloads and the HOA extension payloads for the plurality of layers may be provided with respective levels of error protection. The base layer may have highest error protection and the one or more enhancement layers may have successively decreasing error protection.

In embodiments, the HOA extension payloads may include bit stream elements for a HOA spatial signal prediction decoding tool. Additionally or alternatively, the HOA extension payloads may include bit stream elements for a HOA sub-band directional signal synthesis decoding tool. Additionally or alternatively, the HOA extension payloads may include bit stream elements for a HOA parametric ambience replication decoding tool.

In embodiments, the HOA extension payloads may have a usacExtElementType of ID_EXT_ELE_HOA_ENH_LAYER.

In embodiments, the data structure may further include a HOA configuration extension payload including bitstream elements for configuring a HOA spatial signal prediction decoding tool, a HOA sub-band directional signal synthesis decoding tool, and/or a HOA parametric ambience replication decoding tool.

In embodiments, the data structure may further include a HOA decoder configuration payload including information indicative of the assignment of the HOA extension payloads to the plurality of layers.

In embodiments, methods and apparatuses relate to decoding a compressed Higher Order Ambisonics (HOA) representation of a sound or sound field. The apparatus may be configured for or the method may include receiving a bit stream containing the compressed HOA representation corresponding to a plurality of hierarchical layers that include a base layer and one or more hierarchical enhancement layers, wherein the plurality of layers have assigned thereto components of a basic compressed sound representation of the sound or sound field, the components being assigned to respective layers in respective groups of components, determining a highest usable layer among the plurality of layers for decoding; extracting a HOA extension payload assigned to the highest usable layer, wherein the HOA extension payload includes side information for parametrically enhancing a reconstructed HOA representation corresponding to the highest usable layer, wherein the reconstructed HOA representation corresponding to the highest usable layer is obtainable on the basis of the transport signals assigned to the highest usable layer and any layers lower than the highest usable layer; decoding the compressed HOA representation corresponding to the highest usable layer based on layer information, the transport signals assigned to the highest usable layer and any layers lower than the highest usable layer; and parametrically enhancing the decoded HOA representation using the side information included in the HOA extension payload assigned to the highest usable layer.

The HOA extension payload may include bit stream elements for a HOA spatial signal prediction decoding tool. The layer information may indicate a number of active directional signals in a current frame of an enhancement layer.

The layer information may indicate a total number of additional ambient HOA coefficients for an enhancement layer. The layer information may include HOA coefficient indices for each additional ambient HOA coefficient for an enhancement layer. The layer information may include enhancement information that includes at least one of Spatial Signal Prediction, the Sub-band Directional Signal Synthesis and the Parametric Ambience Replication Decoder. The compressed HOA representation is adapted for a layered coding mode for HOA based content if a CodedVVecLength equal to one is signaled in the HOADecoderConfig( ). Further, v-vector elements may not transmitted for indices that are equal to the indices of additional HOA coefficients included in a set of ContAddHoaCoeff. The set of ContAddHoaCoeff may be separately defined for each of the plurality of hierarchical layers. The layer information includes NumLayers elements, where each element indicates a number of transport signals included in all layers up to an i-th layer. The layer information may include an indicator of all actually used layers for a k-th frame. The layer information may also indicate that all of the coefficients for the predominant vectors are specified. The layer information may indicate that coefficients of the predominant vectors corresponding to the number greater than a MinNumOfCoeffsForAmbHOA are specified. The layer information may indicate that MinNumOfCoeffsForAmbHOA and all elements defined in ContAddHoaCoeff[lay] are not transmitted, where lay is the index of layer containing the vector based signal corresponding to the vector.

According to another aspect, an encoder for layered encoding of a frame of a compressed higher-order Ambisonics, HOA, representation of a sound or sound field is described. The compressed HOA representation may include a plurality of transport signals. The encoder may include a processor configured to perform some or all of the method steps of the methods according to the first-mentioned above aspect and the second-mentioned above aspect.

According to another aspect, a decoder for decoding a frame of a compressed higher-order Ambisonics, HOA, representation of a sound or sound field is described. The compressed HOA representation may be encoded in a plurality of hierarchical layers that include a base layer and one or more hierarchical enhancement layers. The decoder may include a processor configured to perform some or all of the method steps of the methods according to the third-mentioned above aspect.

According to another aspect, a software program is described. The software program may be adapted for execution on a processor and for performing some or all of the method steps outlined in the present document when carried out on a computing device.

According to yet another aspect, a storage medium is described. The storage medium may include a software program adapted for execution on a processor and for performing some or all of the method steps outlined in the present document when carried out on a computing device.

It is to be appreciated that statements made with regard to any of the above aspects or its embodiments also apply to respective other aspects or their embodiments, as the skilled person will appreciate. Repeating these statements for each and every aspect or embodiment has been omitted for reasons of conciseness.

It should be noted that the methods and apparatus including their preferred embodiments as outlined in the present document may be used stand-alone or in combination with the other methods and systems disclosed in this document. Furthermore, all aspects of the methods and apparatus outlined in the present document may be arbitrarily combined. In particular, the features of the claims may be combined with one another in an arbitrary manner.

It should further be noted that method steps and apparatus features may be interchanged in many ways. In particular, the details of the disclosed method can be implemented as an apparatus adapted to execute some or all or the steps of the method, and vice versa, as the skilled person will appreciate.

DESCRIPTION OF THE DRAWINGS

The invention is explained below in an exemplary manner with reference to the accompanying drawings, wherein.

DETAILED DESCRIPTION

Figure 1:
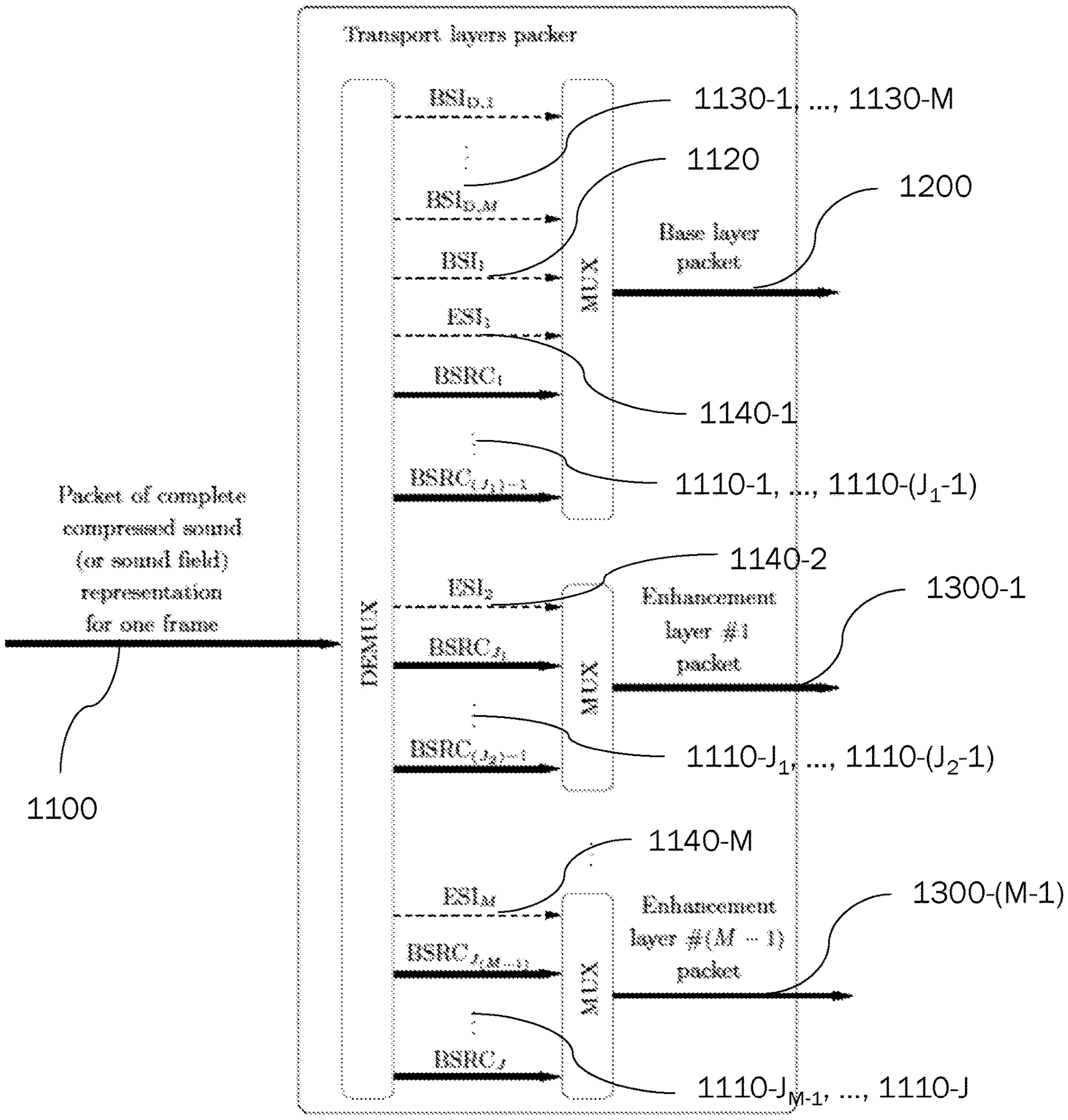
FIG. 1 is a block diagram schematically illustrating an assignment of payloads to the base layer and M−1 enhancement layers at the encoder side.

First, a compressed sound (or sound field) representation to which methods and encoders/decoders according to the present disclosure may be applicable will be described.

For the streaming of a compressed sound (or sound field) representation over a transmission channel with time-varying conditions layered coding is a means to adapt the quality of the received sound representation to the transmission conditions, and in particular to avoid undesired signal drop-outs.

For layered coding, the compressed sound (or sound field) representation is usually subdivided into a high priority base layer of a relatively small size and additional enhancement layers with decremental priorities and arbitrary sizes. Each enhancement layer is typically assumed to contain incremental information to complement that of all lower layers in order to improve the quality of the compressed sound (or sound field) representation. The idea is then to control the amount of error protection for the transmission of the individual layers according to their priority. In particular, the base layer is provided with a high error protection, which is reasonable and affordable due to its low size.

It is assumed in the following that the complete compressed sound (or sound field) representation in general consists of the three following components:

1. A basic compressed sound (or sound field) representation consisting itself of a number of complementary components, which accounts for the distinctively largest percentage of the complete compressed sound (or sound field) representation.
2. Basic side information needed to decode the basic compressed sound representation, which is assumed to be of a much smaller size compared to the basic compressed sound (or sound field) representation. It is further assumed to consist to its greatest part of the two following components, both of which specify the decompression of only one particular component of the basic compressed sound representation:
   a) The first component contains side information describing individual complementary components of the basic compressed sound (or sound field) representation independently of other complementary components.
   b) The second (optional) component contains side information describing individual complementary components of the basic compressed sound (or sound field) representation in dependence on other complementary components. In particular, the dependence has the following properties:
   The dependent side information for each individual complementary component of the basic compressed sound (or sound field) representation achieves its greatest extent in case no other certain complementary components are contained in the basic compressed sound (or sound field) representation.
   In case additional certain complementary components are added to the basic compressed sound (or sound field) representation, the dependent side information for the considered individual complementary component becomes a subset of the original one, thereby reducing its size.
3. Optional enhancement side information to improve the basic compressed sound (or sound field) representation. Its size is also assumed to be much smaller than that of the basic compressed sound (or sound field) representation.

One prominent example of such a type of complete compressed sound (or sound field) representation is given by the compressed HOA sound field representation as specified by the preliminary version of the MPEG-H 3D audio standard.

1. Its basic compressed sound field representation can be identified with a number of quantized monaural signals, representing either so-called predominant sound signals or coefficient sequences of a so-called ambient HOA sound field component.
2. The basic side information describes, amongst others, for each of these monaural signals how it spatially contributes to the sound field. This information may be further separated into the following two different components:
   (a) Side information related to specific individual monaural signals, which is independent of the existence of other monaural signals. Such side information may for instance specify a monaural signal to represent a directional signal (meaning a general plane wave) with a certain direction of incidence. Alternatively, a monaural signal may be specified as a coefficient sequence of the original HOA representation having a certain index.
   (b) Side information related to specific individual monaural signals, which is dependent on the existence of other monaural signals. Such side information occurs e.g if monaural signals are specified to be so-called vector based signals, which means that they are directionally distributed within the sound field, where the directional distribution is specified by means of vector. In a certain mode (i.e. CodedVVecLength=1), particular components of this vector are implicitly set to zero and are not part of the compressed vector representation. These components are those with indices equal to those of coefficient sequence of the original HOA representation, which are part of the basic compressed sound field representation. That means that if individual components of the vector are coded, their total number depends on the basic compressed sound field representation, in particular on which coefficient sequences of the original HOA representation it contains.

If no coefficient sequences of the original HOA representation are contained in the basic compressed sound field representation, the dependent basic side information for each vector-based signal consists of all the vector components and has its greatest size. In case that coefficient sequences of the original HOA representation with certain indices are added to the basic compressed sound field representation, the vector components with those indices are removed from the side information for each vector-based signal, thereby reducing the size of the dependent basic side information for the vector-based signals.

3. The enhancement side information consists of the following components:
   - Parameters related to the so-called (broadband) spatial prediction to (linearly) predict missing portions of the sound field from the directional signals.
   - Parameters related to the so-called Sub-band Directional Signals Synthesis and the Parametric Ambience Replication, which are compression tools that allow a frequency dependent, parametric prediction of additional monaural signals to be spatially distributed in order to complement a so far spatially incomplete or deficient compressed HOA representation. The prediction is based on coefficient sequences of the basic compressed sound field representation. An important aspect is that the mentioned complementary contribution to the sound field is represented within the compressed HOA representation not by means of additional quantized signals, but rather by means of extra side information of a comparably much smaller size. Hence, the two mentioned coding tools are especially suited for the compression of HOA representations at low data rates.

A second example of a compressed representation of a monaural signal with the above-mentioned structure may consist of the following components:

1. Some coded spectral information for disjoint frequency bands up to a certain upper frequency, which can be regarded as a basic compressed representation.
2. Some basic side information specifying the coded spectral information (by e.g. the number and width of coded frequency bands).
3. Some enhancement side information consisting of parameters of a so-called Spectral Band Replication (SBR), describing how to parametrically reconstruct from the basic compressed representation the spectral information for higher frequency bands which are not considered in the basic compressed representation.

Next, a method for the layered coding of a complete compressed sound (or sound field) representation having the aforementioned structure will be described.

It is assumed that the compression is frame based in the sense that it provides compressed representations (e.g., in the form of data packets or equivalently frame payloads) for successive time intervals, for example time intervals of equal size. These data packets are assumed to contain a validity flag, a value indicating their size as well as the actual compressed representation data. Throughout the following description it will be focused mostly on the treatment of a single frame, and hence the frame index will be omitted.

Each frame payload of the considered complete compressed sound (or sound field) representation 1100 is assumed to contain J data packets, each for one component 1110-1, . . . , 1110-J of a basic compressed sound (or sound field) representation, which are denoted by $BSRC_j$, j=1, . . . , J. Further, it is assumed to contain a packet with independent basic side information 1120 denoted by $BSI_I$ specifying particular components $BSRC_j$ of the basic compressed sound representation independently of other components. Optionally, it is additionally assumed to contain a packet with dependent basic side information denoted by $BSI_D$ specifying particular components $BSRC_j$ of the basic compressed sound representation in dependence of other components. The information contained within the two data packets $BSI_I$ and $BSI_D$ can be optionally grouped into one single data packet BSI.

Eventually, it includes an enhancement side information payload denoted by ESI with a description of how to improve the reconstructed sound (or sound field) from the complete basic compressed representation.

The described scheme for layered coding addresses required steps to enable both, the compression part including the packing of data packets for transmission as well as the receiver and decompression part. Each part will be described in detail in the following.

Next, compression and packing for transmission will be described. In case of layered coding (assuming M layers in total, i.e. one basic layer and M−1 enhancement layers) each component of the complete compressed sound (or sound field) representation 1100 is treated as follows:

- The basic compressed sound (or sound field) representation is subdivided into parts to be assigned to the individual layers. Without loss of generality, the grouping can be described by M+1 numbers $J_m$, m=0, . . . , M with $J_0=1$ and $J_M=J+1$ such that $BSRC_j$ is assigned to the m-th layer for $J_{m-1}\leq j<J_m$.
- Due to its small size it reasonable assign the complete basic side information to the base layer to avoid its unnecessary fragmentation. While the independent basic side information $BSI_I$ is left unchanged for the assignment, the dependent basic side information has to be handled specially for layered coding, to allow a correct decoding at the receiver side on the one hand and to reduce the size of the dependent side information to be transmitted on the other hand. It is proposed to decompose it into M parts 1130-1, . . . , 1130-M denoted by $BSI_{D,m}$, m=1, . . . , M, where the m-th part contains dependent side information for each of the components $BSRC_j$, $J_{m-1}\leq j<J_m$, of the basic compressed sound representation assigned to the m-th layer, if the respective dependent side information exists. In case the respective dependent side information does not exist, $BSI_{D,m}$ is assumed to be empty. The side information $BSI_{D,m}$ is dependent on all components $BSRC_j$, $1\leq j<J_m$, contained in all of the layers up to the m-th one.
- In the case of layered coding it is important to realize that the enhancement side information has to be computed for each layer extra, since it is intended to enhance the preliminary decompressed sound (or sound field), which however is dependent on the available layers for decompression. Hence, the compression has to provide M individual enhancement side information data packets 1140-1, . . . , 1140-M, denoted by $ESI_m$, m=1, . . . , M, where the enhancement side information in the m-th data packet $ESI_m$ is computed such as to enhance the sound (or sound field) representation obtained from all data contained in the base layer and enhancement layers with indices lower than m.

Summing up, at the compression stage a frame data packet, denoted by FRAME, has to be provided having the following composition:

$$\text{FRAME}=[BSRC_1 \ldots BSRC_J BSI_I BSI_{D,1} \ldots BSI_{D,M} ESI_1 \ldots ESI_M]. \quad (1)$$

It is understood that the ordering of the individual payloads with the frame data packet is arbitrary in general.

The already described assignment of the individual payloads to the base and enhancement layers is accomplished by a so-called transport layers packer and is schematically illustrated in FIG. 1.

Figure 2:
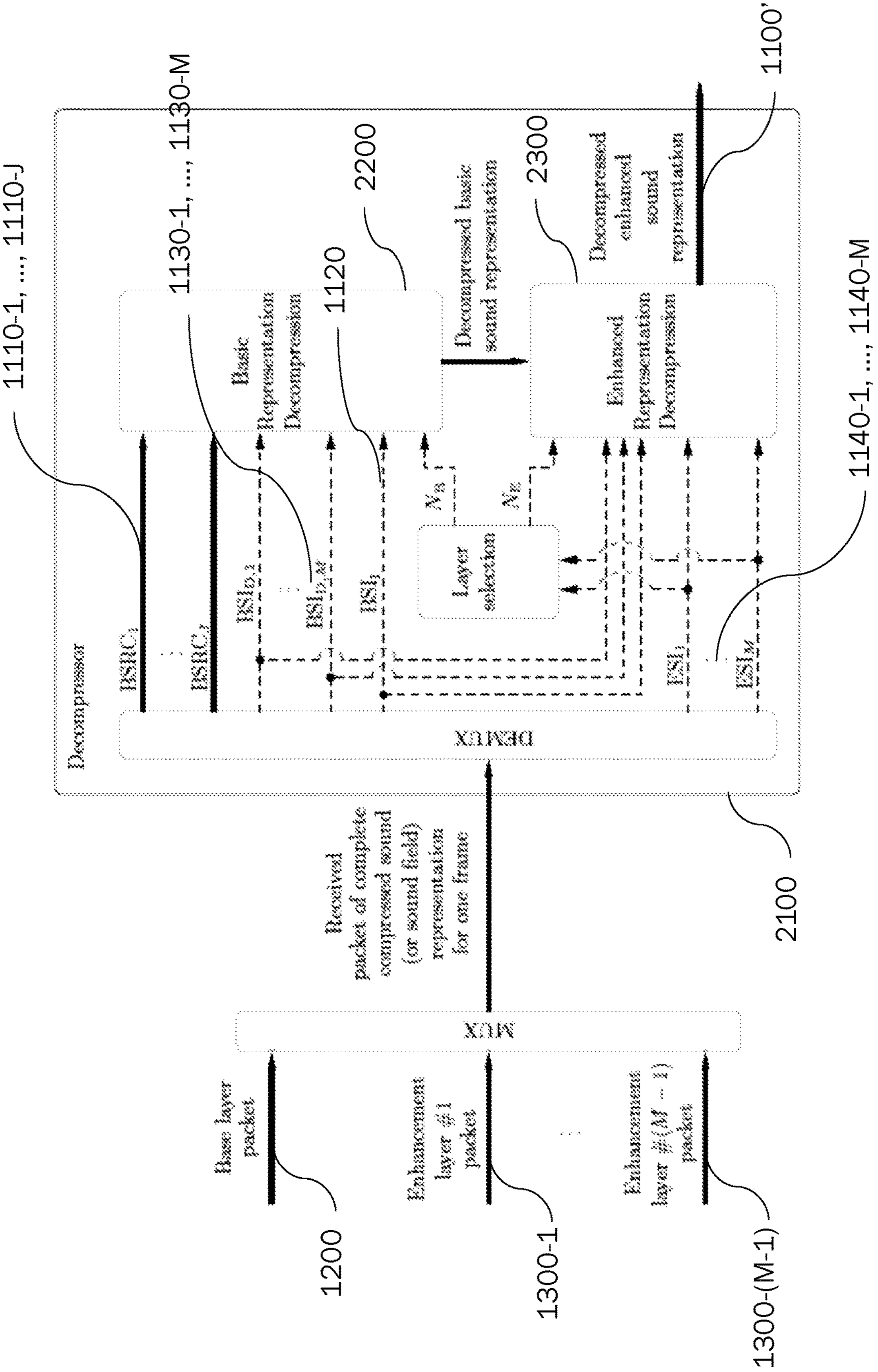
FIG. 2 is a block diagram schematically illustrating an example of a receiver and decompression stage.

Next, receiving and decompression will be described. The corresponding receiver and decompression stage is illustrated in FIG. 2.

First, the individual layer packets 1200, 1300-1, . . . , 1300-(M−1) are multiplexed to provide the received frame packet $$[BSI_I BSI_{D,1} \ldots BSI_{D,M} ESI_1 BSRC_1 \ldots BSRC_{(J_1)-1} \ldots ESI_M BSRC_{J_{(M-1)}} \ldots BSRC_j] \tag{2}$$

of the complete compressed sound (or sound field) representation, which is then passed to the decompressor 2100. It is assumed that if the transmission of an individual layer has been error-free, the validity flag of at least the contained enhancement side information payload is set to "true". In case of an error due to transmission of an individual layer the validity flag within at least the enhancement side information payload in this layer is set to "false". Hence, the validity of a layer packet can be determined from the validity of the contained enhancement side information payload.

In the decompressor 2100, the received frame packet is first de-multiplexed. For this purpose, the information about the size of each payload may be exploited to avoid unnecessary parsing through the data of the individual payloads.

In a next step, the number $N_B$ of the highest layer to be actually used for decompression of the basic sound representation is selected. The highest enhancement layer to be actually used for decompression of the basic sound representation is given by $N_B-1$. Since each layer contains exactly one enhancement side information payload, it is known from each enhancement side information payload if the containing layer is valid or not. Hence, the selection can be accomplished using all enhancement side information payloads $ESI_m$, m=1, . . . , M. Additionally, the index $N_E$ of the enhancement side information payload to be used for decompression is determined, which is always either equal to $N_B$ or equal to zero. This means that the enhancement is accomplished either always in accordance to the basic sound representation or not at all. A more detailed description of the selection is given further below.

Successively, the payloads of the basic compressed sound representation components $BSRC_1$, . . . , $BSRC_j$ are passed together with all of the basic side information payloads (i.e $BSI_I$ and $BSI_{D,m}$, m=1, . . . , M) and the value $N_B$ to a Basic Representation Decompression processing unit 2200, which reconstructs the basic sound (or sound field) representation using only those basic compressed sound representation components contained within the lowest $N_B$ layers (i.e. the base layer and $N_B-1$ enhancement layers). The required information about which components of the basic compressed sound (or sound field) representation are contained in the individual layers is assumed to be known to the decompressor 2100 from a data packet with configuration information, which is assumed to be sent and received before the frame data packets. The actual decoding of each individual dependent basic side information payload $BSI_{D,m}$, m=1, . . . , $N_B$ can be split into two parts as follows:

1. A preliminary decoding of each payload $BSI_{D,m}$, m=1, . . . , $N_B$, by exploiting its dependence on the first $J_m-1$ basic compressed sound representation components BSRC1, . . . , $BSRC_{(J_m)-1}$ contained in the first m layers, which was assumed at the encoding stage.
2. A successive correction of each payload $BSI_{D,m}$, m=1, . . . , $N_B$, by considering that the basic sound component is finally reconstructed from the first $J_{N_B}-1$ basic compressed sound representation components $$BSRC_1, \ldots, BSRC_{(J_{N_B})-1}$$

contained in the first $N_B$>m layers, which are more components than assumed for the preliminary decoding. Hence, the correction can be accomplished by discarding obsolete information, which is possible due to the initially assumed property of the dependent basic side information that if certain complementary components are added to the basic compressed sound (or sound field) representation, the dependent basic side information for each individual complementary component becomes a subset of the original one.

Eventually, the reconstructed basic sound (or sound field) representation together with all enhancement side information payloads $ESI_1$, . . . , $ESI_M$, the basic side information payloads $BSI_I$ and $BSI_{D,m}$, m=1, . . . , M, and the value $N_E$ is provided to an Enhanced Representation Decompression processing unit 2300, which computes the final enhanced sound (or sound field) representation using only the enhancement side information payload $ESI_{N_E}$ and discarding all other enhancement side information payloads. If the value of $N_E$ is equal to zero, all enhancement side information payloads are discarded and the reconstructed final enhanced sound (or sound field) representation is equal to the reconstructed basic sound (or sound field) representation.

Next, layer selection will be described. In the case that all frame data packets may be decompressed independently of each other, both the number $N_B$ of the highest layer to be actually used for decompression of the basic sound representation and the index $N_E$ of the enhancement side information payload to be used for decompression are set to highest number L of a valid enhancement side information payload, which itself may be determined by evaluating the validity flags within the enhancement side information payloads. By exploiting the knowledge of the size of each enhancement side information payload, a complicated parsing through the actual data of the payloads for the determination of their validity can be avoided.

In case that differential decompression with inter-frame dependencies is employed, the decision from the previous frame has to be additionally considered. With differential decompression, independent frame data packets are transmitted at regular time intervals in order to allow starting the decompression from these time instants, where the determination of the values NB and NE becomes frame independent and is carried out as described above.

To explain the frame dependent decision in detail, we first denote for a k-th frame

- the highest number of a valid enhancement side information payload by L(k)
- the highest layer number to be selected and used for decompression of the basic sound representation by $N_B(k)$
- the number of the enhancement side information payload to be used for decompression by $N_E(k)$.

Using this notation, the highest layer number to be used for decompression of the basic sound representation by $N_B(k)$ is computed according to $$N_B(k)=\min(N_B(k-1),L(k)). \tag{3}$$

By choosing $N_B(k)$ not be greater than $N_B(k-1)$ and L(k) it is ensured that all information required for differential decompression of the basic sound representation is available.

The number $N_E(k)$ of the enhancement side information payload to be used for decompression is determined according to $$N_E(k) = \begin{cases} N_B(k) & \text{if } N_B(k) = N_B(k-1) \\ 0 & \text{else} \end{cases}. \quad (4)$$

This means in particular that as long as the highest layer number $N_B(k)$ to be used for decompression of the basic sound representation does not change, the same corresponding enhancement layer number is selected. However, in case of a change of $N_B(k)$, the enhancement is disabled by setting $N_E(k)$ to zero. Due to the assumed differential decompression of the enhancement side information, its change according to $N_B(k)$ is not possible since it would require the decompression of the corresponding enhancement side information layer at the previous frame which is assumed to not have been carried out.

Alternatively, if at decompression all of the enhancement side information payloads with numbers up to $N_E(k)$ are decompressed in parallel, the selection rule (4) can be replaced by $$N_E(k)=N_B(k). \quad (5)$$

Finally, it is to be noted that for differential decompression the number of the highest used layer can only increase at independent frame data packets, whereas a decrease is possible at every frame.

Next, embodiments of the disclosure relating to layered coding of a frame of a compressed sound representation and to a data structure (e.g., bitstream) representing a frame of the encoded compressed sound representation will be described for the case of a compressed HOA representation. In particular, proposed changes to the scheme of layered coding of a compressed HOA representation will be described.

As a correction of the Layered Coding Mode for HOA based content, a new usacExtElementType is defined to better adapt the configuration and frame payloads of the HOA decoding tools Spatial Signal Prediction, Sub-band Directional Signal Synthesis and Parametric Ambience Replication (PAR) Decoder to the corresponding HOA enhancement layer. If the Layered Coding Mode for HOA based content is activated, which is signaled by SingleLayer==0, it is proposed to move the corresponding bit stream elements of these tools to one additional HOA extension payload of the new type for each layer (including the base layer and one or more enhancement layers).

The extension has to be made because the side information for these tools is created to enhance a specific HOA representation. In the current definition of the layered HOA coding the provided data only properly extends the HOA representation of the highest layer. For the lower layers these tools do not enhance the partially reconstructed HOA representation properly.

Therefore, it would be better to provide the side information of these tools for each layer to better adapt them to the reconstructed HOA representation of the corresponding layer. Additionally, the tools Sub-band Directional Signal Synthesis and Parametric Ambience Replication Decoder are specifically designed for low data rates, where only a few transport signals are available. The proposed extension would therefore offer the ability to optimally adapt the side information of these tools to the number of transport signals in the layer. Accordingly, the sound quality of the reconstructed HOA representation for low bit rate layers, e.g., the base layer, can be significantly increased compared to the existing layered approach. Furthermore, the bit stream syntax for the encoded V-vector elements for the vector based signals has to be adapted for the HOA layered coding if a CodedVVecLength equal to one is signaled in the HOADecoderConfig( ). In this vector coding mode the V-vector elements are not transmitted for HOA coefficient indices that are included in the set of ContAddHoaCoeff. This set includes all HOA coefficient indices AmbCoeffIdx[i] that have an AmbCoeffTransitionState equal to zero. There is no need to also add a weighted V-vector signal because the original HOA coefficient sequence for these indices are explicitly sent. Therefore the V-vector element in the conventional approach is set to zero for these indices.

However, in the layered coding mode the set of continuous HOA coefficient indices depends on the transport channels that are part of the currently active layer. This means that additional HOA coefficient indices sent in a higher layer are missing in lower layers. Then the assumption that the vector signal should not contribute to the HOA coefficient sequence is wrong for the HOA coefficient indices that belong to HOA coefficient sequences included in higher layers. Thus, it is proposed to (explicitly) signal the V-vector elements for these missing coefficient indices.

As a consequence, it is proposed to define the set of ContAddHoaCoeff for each layer and to use the set of the layer where the V-vector signal is added (the transport signal of the V-vector signal belongs to) for the selection of the active V-vector elements. Nevertheless, it is proposed that the V-vector data stays in the HOAFrame( ) and is not moved to the HOAEnhFrame( ).

Next, integration into the MPEG-H bitstream syntax will be described. A corresponding method of encoding (e.g., a method of layered encoding of a frame of a compressed HOA representation of a sound or sound field) according to embodiments of the disclosure will be described with reference to FIG. 3. Proposed changes to the MPEG-H 3D bitstream will be described below in the ANNEX.

In the Layered Coding mode the flag SingleLayer in the HOADecoderConfig( ) is inactive (SingleLayer==0) and the number of layers and their corresponding number of assigned HOA transport signals are defined. In general, the compressed HOA representation may comprise a plurality of transport signals.

Figure 3:
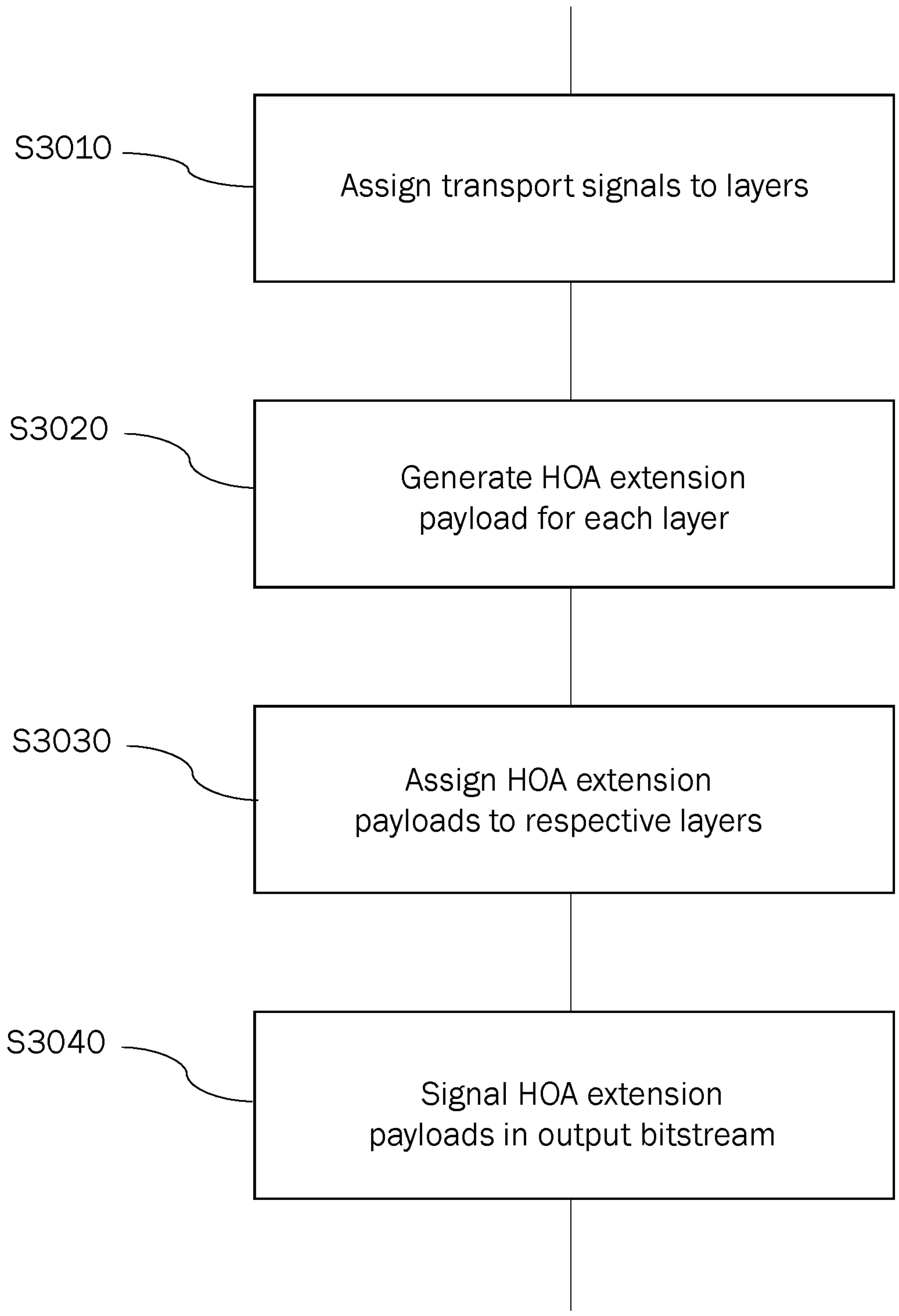
FIG. 3 is a flow chart illustrating an example of a method of layered encoding of a frame of a compressed HOA representation according to embodiments of the disclosure.

Accordingly, at S3010 in FIG. 3, the plurality of transport signals are assigned to a plurality of hierarchical layers. In other words, the transport signals are distributed to the plurality of layers. Each layer may be said to include the respective transport signals assigned to that layer. Each layer may have more than one transport signal assigned thereto. The plurality of layers may include a base layer and one or more hierarchical enhancement layers. The layers may be ordered, from the base layer, through the enhancement layers, up to the overall highest enhancement layer (overall highest layer).

It is proposed to add an additional HOA configuration extension payload and HOA frame extension payload with a newly defined usacExtElementType ID_EXT_ELE_HOA_ENH_LAYER into the MPEG-H bitstream to transmit one payload of Spatial Signal Prediction, Sub-band Directional Signal Synthesis and PAR Decoder data for each HOA enhancement layer (including the base layer). These extra payloads will directly follow the payload of type ID_EXT_ELE_HOA in the mpegh3daExtElementConfig( ) and correspondingly in the mpegh3daFrame( ).

Therefore it is proposed to move, in the case of SingleLayer==0, the configuration elements for the Spatial Signal Prediction, the Sub-band Directional Signal Synthesis and the PAR Decoder from the HOADecoderConfig( ) to a newly defined HOADecoderEnhConfig( ) and the correspondingly the HOAPredictionInfo( ) the HOADirectionalPredictionInfo( ) and the HOAParInfo( ) from the HOAFrame( ) to the newly defined HOAEnhFrame( ).

Accordingly, at S3020, a respective HOA extension payload is generated for each layer. The generated HOA extension payload may include side information for parametrically enhancing a reconstructed HOA representation obtainable from the transport signals assigned to (e.g., included in) the respective layer and any layers lower than the respective layer. As indicated above, the HOA extension payloads may include bit stream elements for one or more of a HOA spatial signal prediction decoding tool, a HOA sub-band directional signal synthesis decoding tool, and a HOA parametric ambience replication decoding tool. Further, the HOA extension payloads may have a usacExtElementType of ID_EXT_ELE_HOA_ENH_LAYER.

At S3030, the generated HOA extension payloads are assigned to their respective layers.

Further (not shown in FIG. 3), a HOA configuration extension payload including bitstream elements for configuring a HOA spatial signal prediction decoding tool, a HOA sub-band directional signal synthesis decoding tool, and/or a HOA parametric ambience replication decoding tool may be generated.

Further (not shown in FIG. 3), a HOA decoder configuration payload including information indicative of the assignment of the HOA extension payloads to the plurality of layers may be generated.

Next, transmission of the layered bitstream (e.g., MPEG-H bitstream) will be described. As all extension payloads of the MPEG-H bitstream are byte-aligned and their sizes are explicitly signaled, were an elementLengthPresent flag equal to one is assumed, a de-packer can parse the MPEG-H bitstream and extract the payloads for layers higher than one and transmit them separately over different transmission channels. The base layer comprises (e.g., consists of) the MPEG-H bitstream excluding data for higher layers. The missing extension payloads are signaled as empty or inactive. For payloads of type ID_USAC_SCE, ID_USAC_CPE and ID_USAC_LFE an empty payload is signaled by an elementLength of zero, where the elementLengthPresent needs to be set to one. The empty payload of type ID_USAC_EXT can be signaled by setting the usacExtElementPresent flag to zero (false).

Accordingly, at S3040, the generated HOA extension payloads are signaled (e.g., transmitted, or output) in an output bitstream. In general, the plurality of layers and the payloads assigned thereto are signaled (e.g., transmitted, or output) in the output bitstream. Further, the HOA decoder configuration payload and/or the HOA configuration extension payload may be signaled (e.g., transmitted, or output) in the output bitstream.

It is assumed that the HOA base layer (layer index equal to one) is transmitted with the highest error protection and has a relatively small bitrate. The error protection for the following layers (one or more HOA enhancement layers) is steadily reduced in accordance with the increasing bit rate of the enhancement layers. Due to bad transmission conditions and lower error protection, the transmission of higher layers might fail and in the worst case only the base layer is correctly transmitted. It is assumed that a combined error protection for all payloads of one layer is applied. Thus if the transmission of a layer fails, all payloads of the corresponding layer are missing.

In other words, the data payloads for the plurality of layers may be transmitted with respective levels of error protection, wherein the base layer has highest error protection and the one or more enhancement layers have successively decreasing error protection.

Unless steps require certain other steps as prerequisites, the aforementioned steps may be performed in any order and the exemplary order illustrated in FIG. 3 is understood to be non-limiting.

As indicated above, the bit stream syntax for the encoded V-vector elements for the vector based signals has to be adapted for the HOA layered coding if a CodedVVecLength equal to one is signaled in the HOADecoderConfig( ). A corresponding method of encoding (e.g., a method of layered encoding of a frame of a compressed HOA representation of a sound or sound field) according to embodiments of the disclosure will be described with reference to FIG. 4.

Figure 4:
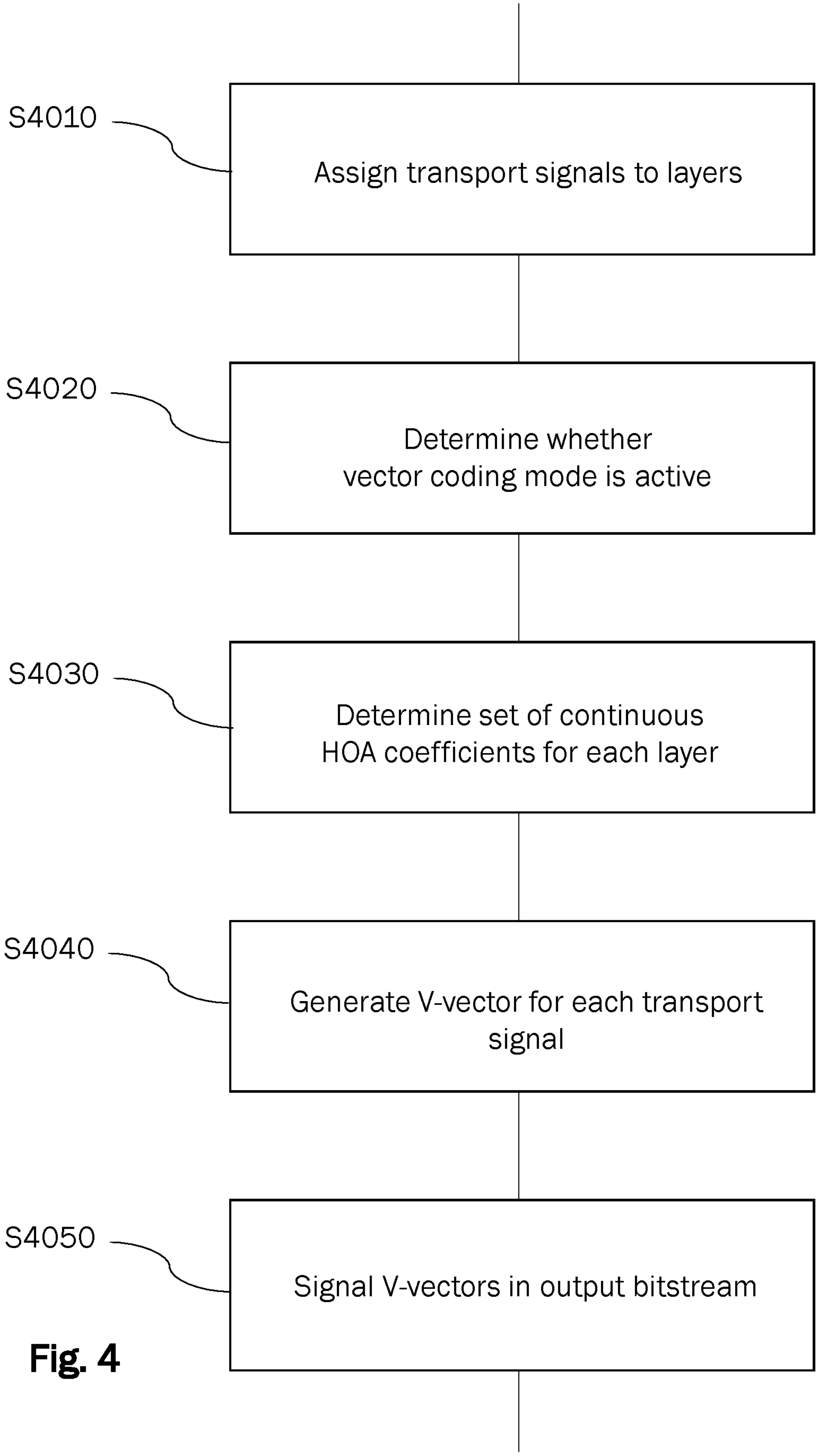
FIG. 4 is a flow chart illustrating another example of a method of layered encoding of a frame of a compressed HOA representation according to embodiments of the disclosure.

At S4010 in FIG. 4, the plurality of transport signals are assigned to a plurality of hierarchical layers. This step may be performed in the same manner as S3010 described above.

At S4020, it is determined whether a vector coding mode is active. This may involve determining whether or not CodedVVecLength==1.

As indicated above, in the conventional approach in the vector coding mode the V-vector elements are not transmitted for HOA coefficient indices that are included in the set of ContAddHoaCoeff. This set includes all HOA coefficient indices AmbCoeffIdx[i] that have an AmbCoeffTransitionState equal to zero. There is no need to also add a weighted V-vector signal because the original HOA coefficient sequence for these indices are explicitly sent. Therefore the V-vector element in the conventional approach is set to zero for these indices.

However, in the layered coding mode the set of continuous HOA coefficient indices depends on the transport channels that are part of the currently active layer. This means that additional HOA coefficient indices sent in a higher layer are missing in lower layers. Then the assumption that the vector signal should not contribute to the HOA coefficient sequence is wrong for the HOA coefficient indices that belong to HOA coefficient sequences included in higher layers.

Thus, if the vector coding mode is active, at S4030 a set of continuous HOA coefficient indices (e.g., ContAddHoaCoeff) is determined (e.g., defined) for each layer on the basis of the transport signals assigned to the respective layer.

If the vector coding mode is active, at S4040, for each transport signal, a V-vector is generated on the basis of the determined set of continuous HOA coefficient indices for the layer to which the respective transport signal is assigned. Each generated V-vector may include elements for any transport signals assigned to layers higher than the layer to which the respective transport signal is assigned. This step may involve using the set of continuous HOA coefficient indices that has been determined for the layer where the V-vector signal is added (the layer that the transport signal of the V-vector signal belongs to) for the selection of the active V-vector elements. Nevertheless, it is proposed that the V-vector data stays in the HOAFrame( ) and is not moved to the HOAEnhFrame( ).

Then, at S4050 the generated V-vectors (V-vector signals) are signaled in the output bitstream. This may involve (explicitly) signaling the V-vector elements for the aforementioned missing coefficient indices.

Steps S4020 to S4050 in FIG. 4 may also be employed in the context of the encoding method illustrated in FIG. 3, e.g., after S3010. In this case, S3040 and S4050 may be combined to a single signaling step.

Unless steps require certain other steps as prerequisites, the aforementioned steps may be performed in any order and the exemplary order illustrated in FIG. 4 is understood to be non-limiting.

At the receiver side an MPEG-H bitstream packer can reinsert the correctly received payloads into the base layer MPEG-H bitstream and pass it to an MPEG-H 3D audio decoder.

Next, HOA Decoding Initialization (configuration) will be described. The HOA configuration payloads of type ID_EXT_ELE_HOA and ID_EXT_ELE_HOA_ENH_LAYER with their corresponding sizes in byte are input to the HOA Decoder for its initialization. The HOA coding tools are configured according to the bitstream elements defined in the HOAConfig( ) which is parsed from the payload of type ID_EXT_ELE_HOA. Further, this payload contains the usage of the Layered Coding Mode, the number of layers and the corresponding number of transport signals per layer. Then, if the layered coding is activated (SingleLayer==0), the HOAEnhConfig( ) are parsed from the payloads of type ID_EXT_ELE_HOA_ENH_LAYER to configure the corresponding Spatial Signal Prediction, Sub-band Directional Signal Synthesis and Parametric Ambience Replication Decoder of each layer.

The element LayerIdx from the HOAEnhConfig( ) together with the order of the HOA enhancement layer configuration payloads in the mpegh3daExtElementConfig( ) indicate the order of the HOA enhancement layers. The order of the HOA enhancement layer frame payloads of type ID_EXT_ELE_HOA_ENH_LAYER in the mpegh3daFrame( ) is identical to the order of the configuration payloads in the mpegh3daExtElementConfig( ) to clearly assign the frame payloads to the corresponding layers.

In the case of SingleLayer==1 (single layer coding) the payloads of type ID_EXT_ELE_HOA_ENH_LAYER are ignored and the Spatial Signal Prediction, Sub-band Directional Signal Synthesis and Parametric Ambience Replication Decoder use the corresponding data from the HOADecoderConfig( ) for their configuration.

Next, HOA frame decoding in layered mode will be described. A corresponding method of decoding (e.g., a method of decoding a frame of a compressed HOA representation of a sound or sound field) according to embodiments of the disclosure will be described with reference to FIG. 5. It is understood that the compressed HOA representation (e.g., the output of the methods of FIG. 3 or FIG. 4 described above) has been encoded in a plurality of hierarchical layers including a base layer and one or more enhancement layers.

Figure 5:
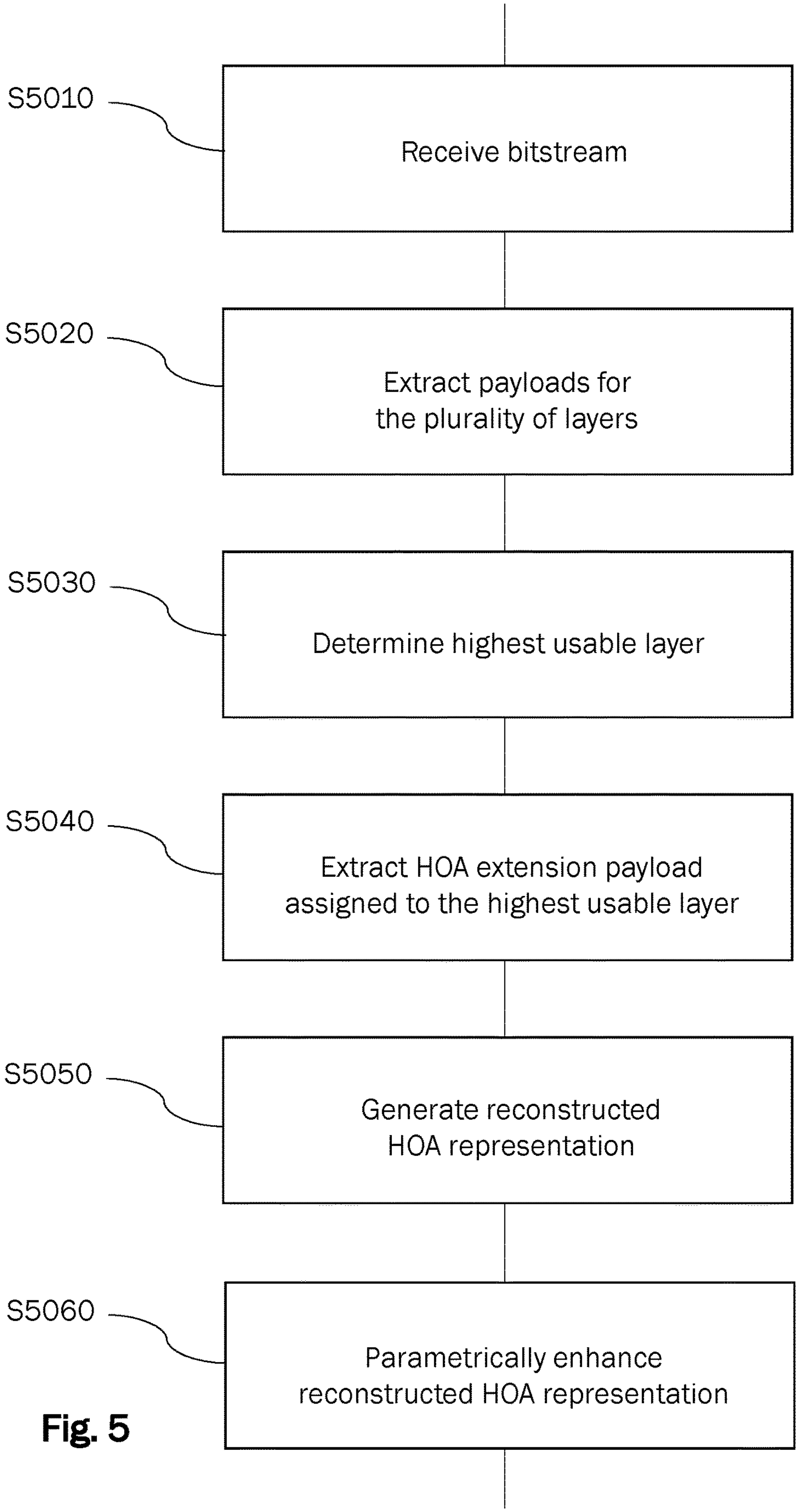
FIG. 5 is a flow chart illustrating an example of a method of decoding a frame of a compressed HOA representation according to embodiments of the disclosure.

At S5010 in FIG. 5, a bitstream relating to the frame of the compressed HOA representation is received.

The 3D audio core decoder decodes the correctly transmitted HOA transport signals and creates transport signals with all samples equal to zero for the corresponding invalid payloads. The decoded transport signals together with the usacExtElementPresent flags, the data and sizes of the HOA payloads of type ID_EXT_ELE_HOA and ID_EXT_ELE_HOA_ENH_LAYER are input to the HOA Decoder. Extension payloads from type ID_USAC_EXT with a usacExtElementPresent flag set to false have to be signaled as missing payloads to the HOA decoder to guarantee the assignment of the payloads to the corresponding layers.

At S5020, payloads for the plurality of layers are extracted. Each payload may include transport signals assigned to a respective layer.

At this step, the HOA Decoder may parse the HOA Frame( ) from the payload of type ID_EXT_ELE_HOA.

Subsequently the valid payloads of type ID_EXT_ELE_HOA_ENH_LAYER and the invalid payloads of type ID_EXT_ELE_HOA_ENH_LAYER are determined by evaluating the corresponding usacExtElementPresent flag of the payloads, where an invalid payload is indicated by an usacExtElementPresent flag equal to false and the assignment of the HOA enhancement payloads to the enhancement layer indices is known from the HOA Decoder configuration.

At S5030, a highest usable layer among the plurality of layers for decoding is determined.

As the layers are dependent from each other in terms of the transport signals, the HOA decoder can only decode a layer when all layers with a lower index are correctly received. The highest usable layer may be selected at this step so that all layers up to the highest usable layer have been correctly received. Details of this step will be described below.

At S5040, a HOA extension payload assigned to the highest usable layer is extracted. As indicated above, the HOA extension payload may include side information for parametrically enhancing a reconstructed HOA representation corresponding to the highest usable layer. Therein, the reconstructed HOA representation corresponding to the highest usable layer may be obtainable on the basis of the transport signals assigned to the highest usable layer and any layers lower than the highest usable layer.

Additionally, HOA extension payloads respectively assigned to the remaining ones of the plurality of layers may be extracted. Each HOA extension payload may include side information for parametrically enhancing a reconstructed HOA representation corresponding to its respective assigned layer. The reconstructed HOA representation corresponding to its respective assigned layer may be obtainable from the transport signals assigned to that layer and any layers lower than that layer.

Further (not shown in FIG. 5), the decoding method may comprise a step of extracting a HOA configuration extension payload. This may be done by parsing the bitstream. The HOA configuration extension payload may include bitstream elements for configuring the HOA spatial signal prediction decoding tool, the HOA sub-band directional signal synthesis decoding tool, and/or the HOA parametric ambience replication decoding tool.

At S5050, the (partially) reconstructed HOA representation corresponding to the highest usable layer is generated on the basis of the transport signals assigned to the highest usable layer and any layers lower than the highest usable layer.

The number of actually used transport signals $I_{ADD,LAY}(k)$ is set in accordance to (the index $M_{LAY}(k)$ of) the highest usable layer and a first preliminary HOA representation is decoded from the HOAFrame( ) and from the corresponding transport signals of the layer and any lower layers.

Then, at S5060 the reconstructed HOA representation is enhanced (e.g., parametrically enhanced) using the side information included in the HOA extension payload assigned to the highest usable layer.

That is, the HOA representation obtained in S5050 is then enhanced by the Spatial Signal Prediction, the Sub-band Directional Signal Synthesis and the Parametric Ambience Replication Decoder using the HOAEnhFrame( ) data parsed from the HOA enhancement layer extension payload of type ID_EXT_ELE_HOA_ENH_LAYER of the currently active layer $M_{LAY}(k)$, i.e., the highest usable layer.

The information used at steps S5020-S5060 may be known as layer information.

Unless steps require certain other steps as prerequisites, the aforementioned steps may be performed in any order and the exemplary order illustrated in FIG. 5 is understood to be non-limiting.

Next, details of the determination (e.g., selection) of the highest usable layer in S5030 will be described.

As indicated above, the HOA decoder can only decode a layer when all layers with a lower index are correctly received, as the layers are dependent from each other in terms of the transport signals.

For the selection of the highest decodable layer the HOA Decoder can create a set of invalid layer indices, where the smallest index from this set minus one results in the index $M_{LAY}$ of the highest decodable enhancement layer. The set of invalid layer indices may be determined by evaluating validity flags of the corresponding HOA extension payloads.

In other words, determining the highest usable layer may involve determining a set of invalid layer indices indicating layers that have not been validly received. It may further involve determining the highest usable layer as the layer that is one layer below the layer indicated by the smallest index in the set of invalid layer indices. Thereby, it is ensured that all layers below the highest usable layer have been validly received.

In case of differential encoding of frames, the index of the highest usable layer of the previous (e.g., immediately preceding) frame will have to be taken into account. First, a situation will be described in which the index of the highest usable layer of the previous (e.g., preceding) frame is kept.

If the index of the highest usable layer (e.g., highest decodable layer) for the current frame is equal to the layer index of the previous frame $M_{LAY}(k-1)$, the layer index of the current frame $M_{LAY}(k)$ is set to $M_{LAY}(k-1)$.

Then the number of actually used transport signals $I_{ADD,LAY}$ (k) is set in accordance to $M_{LAY}(k)$ and a first preliminary HOA representation is decoded from the HOAFrame( ) and from the corresponding transport signals of the layer and any lower layers, as indicated above. This HOA representation is then enhanced by the Spatial Signal Prediction, the Sub-band Directional Signal Synthesis and the Parametric Ambience Replication Decoder using the HOAEnhFrame( ) data parsed from the HOA enhancement layer extension payload of type ID_EXT_ELE_HOA_ENH_LAYER of the currently active layer $M_{LAY}(k)$, as indicated above.

Next, a situation will be described in which it is switched to an index lower than the index of the highest usable layer of the previous (e.g., preceding) frame. Namely, in the case where the index of the highest decodable layer for the current frame is smaller than the index of the layer of the previous frame $M_{LAY}(k-1)$, the HOA decoder sets $M_{LAY}(k)$ to the index of the highest decodable layer for the current frame. The decoding of the payloads for the Spatial Signal Prediction, Sub-band Directional Signal Synthesis and Parametric Ambience Replication Decoder for the new layer can only start at the next HOA Frame with a hoaIndependency Flag equal to one. Until such a HOAFrame( ) has been received, the HOA representation of the layer of index $M_{LAY}(k)$ is reconstructed without performing the Spatial Signal Prediction, Sub-band Directional Signal Synthesis and Parametric Ambience Replication Decoder. This means that the number of actually used transport signals $I_{ADD,LAY}$ (k) is set in accordance to $M_{LAY}(k)$ and only the first preliminary HOA representation is decoded from the HOAFrame( ) and from the corresponding transport signals of the layer and any lower layers. Then, if a HOAFrame( )with a hoaIndependencyFlag equal to one has been received, the payloads for the Spatial Signal Prediction, Sub-band Directional Signal Synthesis and Parametric Ambience Replication Decoder are parsed and decoded to enhance the preliminary HOA representation, so that the full quality of the currently active layer is provided for this frame.

Thus, the proposed method may comprise (not shown in FIG. 5) deciding not to perform parametric enhancement of the reconstructed HOA representation using the side information included in the HOA extension payload assigned to the highest usable layer if the highest usable layer of the current frame is lower than the highest usable layer of the previous frame (if the current frame has been coded differentially with respect to the previous frame).

In general, determining the highest usable layer for the current frame may involve determining a set of invalid layer indices indicating layers that have not been validly received for the current frame. It may further comprise determining a highest usable layer of a previous frame preceding the current frame. It may yet further comprise determining the highest usable layer as the lower one of the highest usable layer of the previous frame and the layer that is one layer below the layer indicated by the smallest index in the set of invalid layer indices (if the current frame has been coded differentially with respect to the previous frame).

An alternative solution may always parse all valid enhancement layer payloads (e.g., HOA extension payloads) in parallel even if they are currently inactive. This would enable a direct switching to a layer with a lower index with full quality, where the Spatial Signal Prediction, Sub-band Directional Signal Synthesis and Parametric Ambience Replication (PAR) Decoder can be applied directly at the switched frame.

Next, a situation will be described in which it is switched to an index higher than the index of the highest usable layer of the previous (e.g., preceding) frame. This switching to a layer with a higher index can only be applied if the mpegh3daFrame( ) has a usacIndependencyFlag equal to one (e.g., if the frame is an independent frame) because all the corresponding payloads or decoding states of previous frames are missing. Thus the HOA decoder keeps the HOA layer index $M_{LAY}(k)$ equal to $M_{LAY}(k-1)$ until an mpegh3daFrame( ) with a usacIndependencyFlag equal to one (e.g., an independent frame) has been received that contains valid data for a higher decodable layer. Then $M_{LAY}(k)$ is set to the highest decodable layer index for the current frame and accordingly the number of actually used transport signals $I_{ADD,LAY}$ (k) is determined. The preliminary HOA representation of that layer is decoded from the HOAFrame( ) and the corresponding transport signals and is enhanced by the Spatial Signal Prediction, the Sub-band Directional Signal Synthesis and the Parametric Ambience Replication Decoder using the HOAEnhFrame( ) parsed from the HOA enhancement layer extension payload of type ID_EXT_ELE_HOA_ENH_LAYER of the currently active layer $M_{LAY}(k)$.

Figure 6:
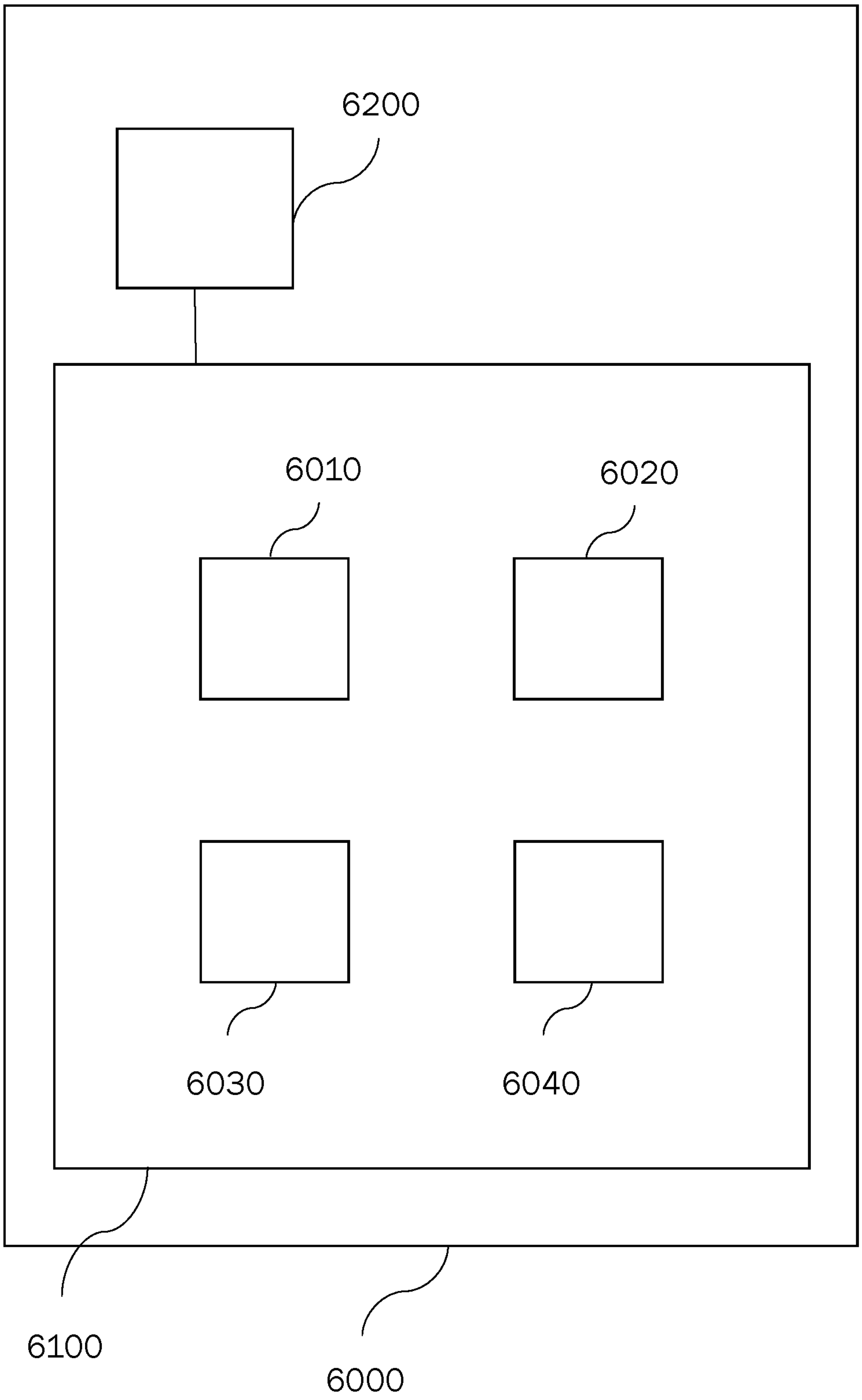
FIG. 6 is a block diagram schematically illustrating an example of a hardware implementation of an encoder according to embodiments of the disclosure.

It is understood that the proposed method of layered encoding of a compressed sound representation may be implemented by an encoder for layered encoding of a compressed sound representation. Such encoder may comprise respective units adapted to carry out respective steps described above. An example of such encoder 6000 is schematically illustrated in FIG. 6. For instance, such encoder 6000 may comprise a transport signal assignment unit 6010 adapted to perform aforementioned S3010, a HOA extension layer payload generation unit 6020 adapted to perform aforementioned S3020, a HOA extension payload assignment unit 6030 adapted to perform aforementioned S3030, and a signaling unit or output unit 6040 adapted to perform aforementioned S3040. It is further understood that the respective units of such encoder may be embodied by a processor 6100 of a computing device that is adapted to perform the processing carried out by each of said respective units, i.e. that is adapted to carry out some or all of the aforementioned steps of the proposed encoding method schematically illustrated in FIG. 3. Additionally or alternatively, the processor 6100 may be adapted to carry out each of the steps of the encoding method schematically illustrated in FIG. 4. To this end, the processor 6100 may be adapted to implement respective units of the encoder. The encoder or computing device may further comprise a memory 6200 that is accessible by the processor 6100.

Figure 7:
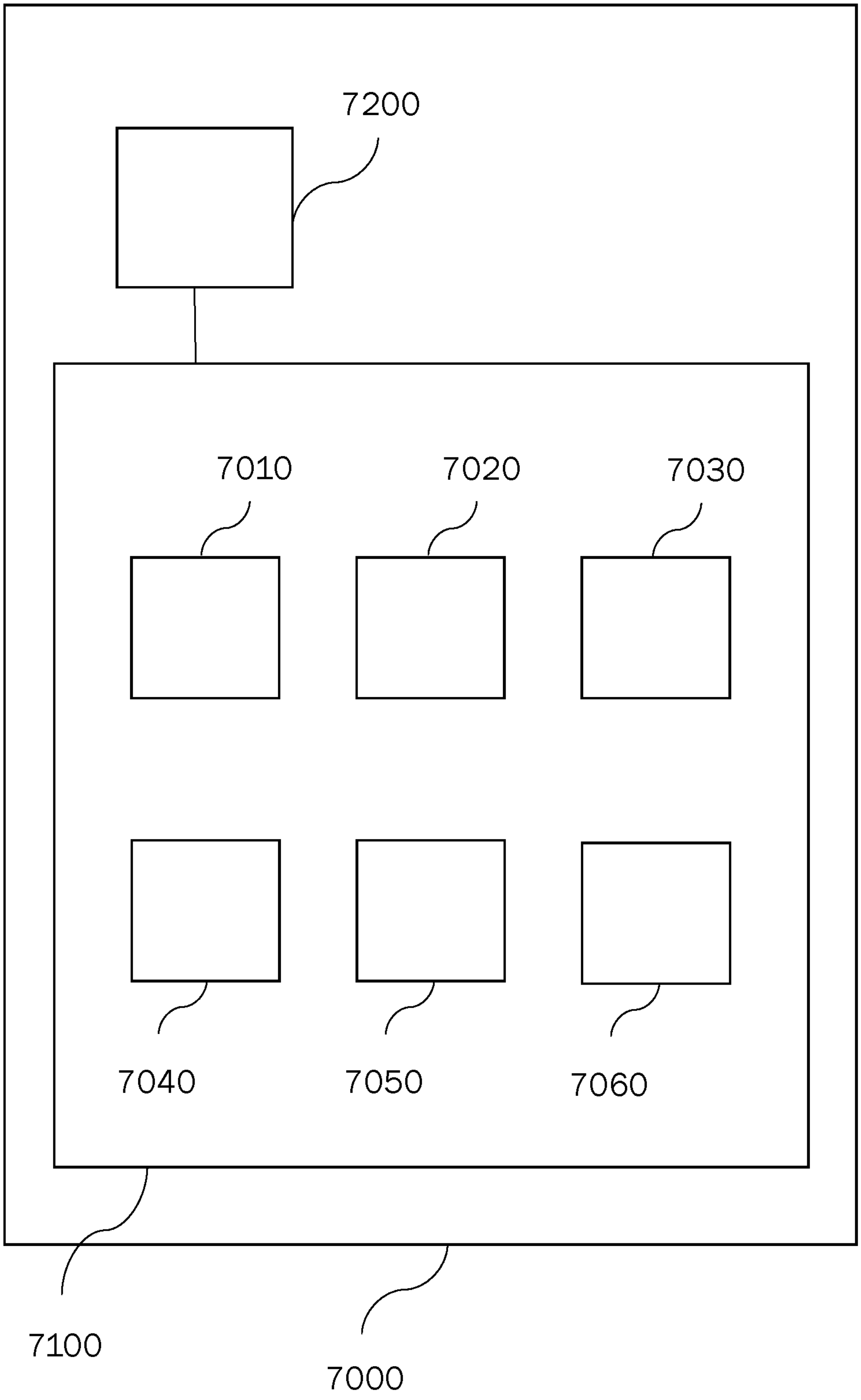
FIG. 7 is a block diagram schematically illustrating an example of a hardware implementation of a decoder according to embodiments of the disclosure.

It is further understood that the proposed method of decoding a compressed sound representation that is encoded in a plurality of hierarchical layers may be implemented by a decoder for decoding a compressed sound representation that is encoded in a plurality of hierarchical layers. Such decoder may comprise respective units adapted to carry out respective steps described above. An example of such decoder 7000 is schematically illustrated in FIG. 7. For instance, such decoder 7000 may comprise a receiving unit 7010 adapted to perform aforementioned S5010, a payload extraction unit 7020 adapted to perform aforementioned S5020, a highest usable layer determination unit 7030 adapted to perform aforementioned S5030, a HOA extension payload extraction unit 7040 adapted to perform aforementioned S5040, a reconstructed HOA representation generation unit 7050 adapted to perform aforementioned S5050, and an enhancement unit 7060 adapted to perform aforementioned S5060. It is further understood that the respective units of such decoder may be embodied by a processor 7100 of a computing device that is adapted to perform the processing carried out by each of said respective units, i.e. that is adapted to carry out some or all of the aforementioned steps of the proposed decoding method. The decoder or computing device may further comprise a memory 7200 that is accessible by the processor 7100.

Next, a data structure (e.g., bitstream) for accommodating (e.g., representing) the compressed HOA representation in layered coding mode will be described. Such a data structure may arise from employing the proposed encoding methods and may be decoded (e.g., decompressed) by using the proposed decoding method.

The data structure may comprise a plurality of HOA frame payloads corresponding to respective ones of a plurality of hierarchical layers. The plurality of transport signals may be assigned to (e.g., may belong to) respective ones of to the plurality of layers. The data structure may comprise a respective HOA extension payload including side information for parametrically enhancing a reconstructed HOA representation obtainable from the transport signals assigned to the respective layer and any layers lower than the respective layer. The HOA frame payloads and the HOA extension payloads for the plurality of layers may be provided with respective levels of error protection, as indicated above. Further, the HOA extension payloads may comprise the bit stream elements indicated above and may have a usacExtElementType of ID_EXT_ELE_HOA_ENH_LAYER. The data structure may yet further comprise a HOA configuration extension payload and/or a HOA decoder configuration payload including the bitstream elements indicated above.

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods and apparatus described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and apparatus may be stored on media such as random access memory or optical storage media. They may be transferred via networks, such as radio networks, satellite networks, wireless networks or wireline networks, e.g. the Internet.

TABLE 1

Syntax of mpegh3daExtElementConfig( )

| Syntax | No. of bits | Mnemonic |
|---|---|---|
| mpegh3daExtElementConfig( ) | | |
| { | | |
| usacExtElementType = escapedValue(4, 8, 16); | | |
| usacExtElementConfigLength = escapedValue(4, 8, 16); | | |
| if (usacExtElementDefaultLengthPresent) { | 1 | uimsbf |
| usacExtElementDefaultLength = escapedValue(8, 16, 0) + 1; | | |
| } else { | | |
| usacExtElementDefaultLength = 0; | | |
| } | | |
| usacExtElementPayloadFrag; | 1 | uimsbf |
| switch (usacExtElementType) { | | |
| case ID_EXT_ELE_FILL: | | |
| /* No configuration element */ | | |

TABLE 1-continued

Syntax of mpegh3daExtElementConfig( )

| Syntax | No. of bits | Mnemonic |
|---|---|---|
| break; | | |
| case ID_EXT_ELE_MPEGS: | | |
| SpatialSpecificConfig( ); | | |
| break; | | |
| case ID_EXT_ELE_SAOC: | | |
| SAOCSpecificConfig( ); | | |
| break; | | |
| case ID_EXT_ELE_AUDIOPREROLL: | | |
| /* No configuration element */ | | |
| break; | | |
| case ID_EXT_ELE_UNI_DRC: | | |
| mpegh3daUniDrcConfig( ); | | |
| break; | | |
| case ID_EXT_ELE_OBJ_METADATA: | | |
| ObjectMetadataConfig( ); | | |
| break; | | |
| case ID_EXT_ELE_SAOC_3D: | | |
| SAOC3DSpecificConfig( ); | | |
| break; | | |
| case ID_EXT_ELE_HOA: | | |
| HOAConfig( ); | | |
| break; | | |
| case ID_EXT_ELE_HOA_ENH_LAYER: | | |
| HOAEnhConfig( ); | | |
| break; | | |
| case ID_EXT_ELE_FMT_CNVRTR | | |
| /* No configuration element */ | | |
| break; | | |
| default: | NOTE | |
| while (usacExtElementConfigLength--) { | | |
| tmp; | 8 | uimsbf |
| } | | |
| break; | | |
| } | | |
| } | | |

NOTE:
The default entry for the usacExtElementType is used for unknown extElementTypes so that legacy decoders can cope with future extensions.

TABLE 2

Value of usacExtElementType

| usacExtElementType | Value |
|---|---|
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| ID_EXT_ELE_FMT_CNVRTR | 8 |
| ID_EXT_ELE_HOA_ENH_LAYER | 9 |
| /* reserved for ISO use */ | 10-127 |
| /* reserved for use outside of ISO scope */ | 128 and higher |

NOTE:
Application-specific usacExtElementType values are mandated to be in the space reserved for use outside of ISO scope. These are skipped by a decoder as a minimum of structure is required by the decoder to skip these

TABLE 3

Interpretation of data blocks for extension payload decoding

| usacExtElementType | The concatenated usacExtElementSegmentData represents: |
|---|---|
| ID_EXT_ELE_FILL | Series of fill_byte |
| ID_EXT_ELE_MPEGS | SpatialFrame( ) as defined in ISO/IEC 23003-1 |
| ID_EXT_ELE_SAOC | SAOCFrame( ) as defined in ISO/IEC 23003-2 |
| ID_EXT_ELE_AUDIOPREROLL | AudioPreRoll( ) |
| ID_EXT_ELE_UNI_DRC | uniDrcGain( ) as defined in ISO/IEC 23003-4 |
| ID_EXT_ELE_OBJ_METADATA | object_metadata( ) |
| ID_EXT_ELE_SAOC_3D | Saoc3DFrame( ) |
| ID_EXT_ELE_HOA | HOAFrame( ) |
| ID_EXT_ELE_HOA_ENH_LAYER | HOAEnhFrame( ) |
| ID_EXT_ELE_FMT_CNVRTR | FormatConverterFrame( ) |
| unknown | unknown data. The data block shall be discarded. |

TABLE 4

Syntax of HOADecoderConfig( )

| Syntax | No. of bits | Mnemonic |
|---|---|---|
| HOADecoderConfig(numHOATransportChannels) | | |
| { | | |
| MinAmbHoaOrder = escapedValue(3,5,0) − 1; | 3,8 | uimsbf |

TABLE 4-continued

| Syntax of HOADecoderConfig( ) | | |
|---|---|---|
| Syntax | No. of bits | Mnemonic |
| MinNumOfCoeffsForAmbHOA = (MinAmbHoaOrder + 1)^2; | | |
| NumOfAdditionalCoders = numHOATransportChannels − MinNumOfCoeffsForAmbHOA; | | |
| if(SingleLayer == 0){ | 1 | bslbf |
| HOALayerChBits = ceil(log2(NumOfAdditionalCoders)); | | |
| NumHOAChannelsLayer[0] = codedLayerCh + MinNumOfCoeffsForAmbHOA; | HOALayerChBits | uimsbf |
| remainingCh = numHOATransportChannels − NumHOAChannelsLayer[0]; | | |
| NumLayers = 1; | | |
| while (remainingCh>1) { | | |
| HOALayerChBits = ceil(log2(remainingCh)); | | |
| NumHOAChannelsLayer[NumLayers] = NumHOAChannelsLayer[NumLayers-1] + codedLayerCh + 1; | HOALayerChBits | uimsbf |
| remainingCh = remainingCh − NumHOAChannelsLayer[NumLayers]; | | |
| NumLayers++; | | |
| } | | |
| if (remainingCh) { | | |
| NumHOAChannelsLayer[NumLayers] = NumOfAdditionalCoders; | | |
| NumLayers++; | | |
| } | | |
| } | | |
| | 4 | |
| CodedSpatialInterpolationTime; | 3 | uimsbf |
| SpatialInterpolationMethod; | 1 | bslbf |
| CodedVVecLength; | 2 | uimsbf |
| MaxGainCorrAmpExp; | 3 | uimsbf |
| HOAFrameLengthIndicator; | 2 | uimsbf |
| MaxHOAOrderToBeTransmitted = escapedValue(2,5,0) + MinAmbHoaOrder; | | |
| MaxNumOfCoeffsToBeTransmitted = (MaxHOAOrderToBeTransmitted + 1)^2; | | |
| MaxNumAddActiveAmbCoeffs = MaxNumOfCoeffsToBeTransmitted − MinNumOfCoeffsForAmbHOA; | | |
| VqConfBits = ceil( log2( ceil( log2(NumOfHoaCoeffs)))) | | |
| NumVVecVqElementsBits++; | VqConf Bits | uimsbf |
| if( MinAmbHoaOrder == 1) { | | |
| UsePhaseShiftDecorr; | 1 | bslbf |
| } | | |
| if(SingleLayer == 1) { | | |
| HOADecoderEnhConfig( ); | 2 | uimsbf |
| } | | |
| AmbAsignmBits = ceil( log2( MaxNumAddActiveAmbCoeffs ) ); | | |
| ActivePredIdsBits = ceil( log2( NumOfHoaCoeffs ) ); | | |
| i = 1; | | |
| while( i * ActivePredIdsBits + ceil( log2( i ) ) < NumOfHoaCoeffs ){ | | |
| i++; | | |
| } | | |
| NumActivePredIdsBits = ceil( log2( max( 1, i − 1) ) ); | | |
| GainCorrPrevAmpExpBits = ceil( log2( ceil( log2( 1.5 * NumOfHoaCoeffs ) ) + MaxGainCorrAmpExp + 1 ) ); | | |
| for (i=0; i<NumOfAdditionalCoders; ++i){ | | |
| AmbCoeffTransitionState[i] = 3; | | |
| } | | |
| } | | |

NOTE:
MinAmbHoaOrder = 30 ... 37 are reserved. HOAFrameLengthIndicator = 3 is reserved.

New Table ? - Syntax of HOAEnhConfig( )

| Syntax | No. of bits | Mnemonic |
|---|---|---|
| HOAEnhConfig( ) | | |
| { | | |
| LayerIdx | HOALayerChBits | uimsbf |

-continued

New Table ? - Syntax of HOAEnhConfig( )

| Syntax | No. of bits | Mnemonic |
|---|---|---|
| HOADecoderEnhConfig( ); | | |
| } | | |

New Table ? - Syntax of HOADecoderEnhConfig( )

| Syntax | No. of bits | Mnemonic |
|---|---|---|
| HOADecoderEnhConfig( ) | | |
| { | | |
| MaxNoOfDirSigsForPrediction = MaxNoOfDirSigsForPrediction + 1; | 2 | uimsbf |
| NoOfBitsPerScalefactor = NoOfBitsPerScalefactor + 1; | 4 | uimsbf |
| if(PredSubbandsIdx < 3) { | 2 | uimsbf |
| NumOfPredSubbands = | | |
| NumOfPredSubbandsTable[PredSubbandsIdx]; | | |
| PredSubbandWidths = | | |
| PredSubbandWidthTable[PredSubbandsIdx]; | | |
| } | | |
| else { | | |
| CodedNumberOfSubbands | 5 | uimsbf |
| NumOfPredSubbands = CodedNumberOfSubbands+1; | | |
| PredSubbandWidths = | | |
| getSubbandWidths(NumOfPredSubbands); | | |
| } | | |
| if( NumOfPredSubbands > 0 ) { | | |
| FirstSBRSubbandIdxBits = ceil( log2 (NumOfPredSubbands+1)); | | |
| FirstSBRSubbandIdx; | FirstSBR Subband IdxBits | uimsbf |
| MaxNumOfPredDirs = 2^( MaxNumOfPredDirsLog2); | 3 | uimsbf |
| MaxNumOfPredDirsPerBand = escapedValue(3,2,5) + 1; | | |
| NumOfBitsPerDirIdx = | 2 | uimsbf |
| NumOfBitsPerDirIdxTable[DirGridTableIdx]; | | |
| } | | |
| if( ParSubbandTableIdx < 3 ) { | 2 | uimsbf |
| NumOfParSubbands = | | |
| NumOfParSubbandsTable[ParSubbandTableIdx]; | | |
| ParSubbandWidths = | | |
| ParSubbandWidthTable[ParSubbandTableIdx]; | | |
| } | | |
| else { | | |
| CodedNumberOfSubbands | 5 | uimsbf |
| NumOfParSubbands = CodedNumberOfSubbands+1; | | |
| ParSubbandWidths = | | |
| getSubbandWidths(NumOfParSubbands); | | |
| } | | |
| if( NumOfParSubbands > 0 ) { | | |
| LastFirstOrderSubbandIdxBits = | | |
| ceil( log2(NumOfParSubbands + 1) ); | | |
| LastFirstOrderSubbandIdx; | LastFirst OrderSu bbandIdx Bits | uimsbf |
| for ( idx = 0; idx < NumOfParSubbands; idx++) { | | |
| UseRealCoeffsPerParSubband[idx]; | 1 | bslbf |
| } | | |
| for ( idx = 0; idx < LastFirstOrderSubBandIdx; idx++) { | | |
| UpmixHoaOrderPerParSubband[idx] = 1; | | |
| MaxNumOfDecoSigs[idx] = | | |
| (UpmixHoaOrderPerParSubband[idx] + 1)^2; | | |
| } | | |
| for ( idx = LastFirstOrderSubBandIdx; | | |
| idx < NumOfParSubbands; idx++) { | | |
| (UpmixHoaOrderPerParSubband[idx] = 2; | | |
| MaxNumOfDecoSigs[idx] = | | |
| (UpmixHoaOrderPerParSubband[idx] + 1)^2; | | |
| } | | |
| } | | |
| } | | |

TABLE 5

Syntax of HOAFrame

| Syntax | No. of bits | Mnemonic |
|---|---|---|
| HOAFrame( ) | | |
| { | | |
| NumOfDirSigs = 0; | | |
| for(lay=0; (lay< NumLayers) & !SingleLayer; ++lay){ | | |
| NumOfDirSigsPerLayer[lay] = 0; | | |
| NumOfAddHoaChansPerLayer[lay] = 0; | | |
| NumOfContAddHoaChans[lay] = 0; | | |
| } | | |
| NumOfVecSigs = 0; | | |
| NumOfAddHoaChans = 0; | | |
| NumOfAddVVecValCoeffIdx = 0; | | |
| hoaIndependencyFlag; | 1 | bslbf |
| for(i=0; i< NumOfAdditionalCoders; ++i){ | | |
| ChannelSideInfoData(i); | | |
| HOAGainCorrectionData(i); | | |
| switch ChannelType[i] { | | |
| case 0: | | |
| DirSigChannelIds[NumOfDirSigs] = i + 1; | | |
| NumOfDirSigs++; | | |
| for(lay=0; (lay< NumLayers) & !SingleLayer; ++lay){ | | |
| if( (MinNumOfCoeffsForAmbHOA + i ) < | | |
| NumHOAChannelsLayer[lay]){ | | |
| NumOfDirSigsPerLayer[lay]++; | | |
| } | | |
| } | | |
| break; | | |
| case 1: | | |
| VecSigChannelIds[NumOfVecSigs] = i + 1; | | |
| VecSigLayerIdx[NumOfVecSigs] = 0; | | |
| if (SingleLayer == 0) { | | |
| lay = 0; | | |
| while( (MinNumOfCoeffsForAmbHOA + i ) | | |
| ≥ NumHOAChannelsLayer[lay]) { | | |
| lay ++; | | |
| } | | |
| VecSigLayerIdx[NumOfVecSigs] = lay; | | |
| } | | |
| NumOfVecSigs++; | | |
| break; | | |
| case 2: | | |
| if (AmbCoeffTransitionState[i] == 0) { | | |
| for(lay=0; (lay< NumLayers); ++lay){ | | |
| if( (MinNumOfCoeffsFor AmbHOA + i ) < | | |
| NumHOAChannelsLayer[lay]){ | | |
| ContAddHoaCoeff[lay] | | |
| [NumOfContAddHoaChans[lay]] = | | |
| = AmbCoeffIdx[i]; | | |
| NumOfContAddHoaChans[lay]++; | | |
| } | | |
| } | | |
| AddHoaCoeff[NumOfAddHoaChans] = | | |
| AmbCoeffIdx[i]; | | |
| for(lay=0; (lay< NumLayers) & (SingleLayer == 0); | | |
| ++lay){ | | |
| if( (MinNumOfCoeffsForAmbHOA + i ) < | | |
| NumHOAChannelsLayer[lay]){ | | |
| AddHoaCoeffPerLayer[lay][NumOfAddHoaChans] | | |
| = AmbCoeffIdx[i]; | | |
| NumOfAddHoaChansPerLayer[lay]++; | | |
| } | | |
| } | | |
| NumOfAddHoaChans++; | | |
| break; | | |
| } | | |
| } | | |
| for ( i= NumOfAdditionalCoders; | | |
| i< NumHOATransportChannels; ++i){ | | |
| HOAGainCorrectionData(i); | | |
| } | | |
| for(i=0; i< NumOfVecSigs; ++i){ | | |
| VVectorData ( VecSigChannelIds(i) ); | | |
| } | | |

TABLE 5-continued

Syntax of HOAFrame

| Syntax | No. of bits | Mnemonic |
|---|---|---|
| if(SingleLayer == 1) { | | |
| HOAEnhFrame( ); | | |
| } | | |
| } | | |

NOTE:
the encoder shall set hoaIndependencyFlag to 1 if usacIndependencyFlag (see mpegh3daFrame( )) is set to 1.
NOTE:
If SingleLayer == 1 set NumLayers = 1.

| | |
|---|---|
| NumOfDirSigsPerLayer[lay] | This elements determines the number of active directional signals in the current HOAFrame( ) actually used in the HOA enhancement layer lay. |
| AddHoaCoeffPerLayer[lay] | This array contains the HOA coefficient index for each additional ambient HOA coefficient actually used in the HOA enhancement layer lay. |
| NumOfAddHoaChansPerLayer[lay] | This element signals the total number of additional ambient HOA coefficients actually used in the HOA enhancement layer lay. |

New Table ? - Syntax of HOAEnhFrame

| Syntax | No. of bits | Mnemonic |
|---|---|---|
| HOAEnhFrame( ) | | |
| { | | |
| if( ((SingleLayer == 1) & (NumOfDirSigs > 0)) \| | | |
| ((SingleLayer == 0) & (NumOfDirSigsPerLayer[lay]) > 0) | | |
| ){ | | |
| HOAPredictionInfo( ) | | |
| } | | |
| if( NumOfPredSubbands > 0) { | | |
| HOADirectionalPredictionInfo( ); | | |
| } | | |
| if( NumOfParSubbands > 0) { | | |
| HOAParInfo( ); | | |
| } | | |
| } | | |

Note:
lay is the index of the currently active HOA enhancement layer

TABLE 6

Syntax of VVectorData( )

| Syntax | No. of bits | Mnemonic |
|---|---|---|
| VVectorData(i) | | |
| { | | |
| if (CodedVVecLength == 1) { | | |
| VVecLengthUsed = VVecLength[i]; | | |
| VVecCoeffIdUsed = VVecCoeffId[i]; | | |
| } else { | | |
| VVecLengthUsed = VVecLength; | | |
| VVecCoeffIdUsed = VVecCoeffId; | | |
| } | | |
| if (NbitsQ(k)[i] == 4){ | | |
| if (Num VvecIndices(k)[i] == 1) { | | |
| VecIdx[0] = VecIdx + 1; | 10 | uimsbf |
| WeightVal[0] =((SgnVal*2)−1); | 1 | uimsbf |
| } else { | | |

TABLE 6-continued

Syntax of VVectorData( )

| Syntax | No. of bits | Mnemonic |
|---|---|---|
| WeightIdx; | 8 | uimsbf |
| nbitsIdx = ceil(log2(NumOfHoaCoeffs)); | | |
| for (j=0; j< NumVvecIndices(k)[i]; ++j) { | | |
| VvecIdx[j] = VvecIdx + 1; | nbitsIdx | uimsbf |
| WeightVal[j] = ((SgnVal*2)−1) * WeightValCdbk[CodebkIdx(k)[i]][WeightIdx][j]; | 1 | uimsbf |
| } | | |
| } | | |
| } | | |
| else if (NbitsQ(k)[i] == 5) { | | |
| for (m=0; m< VVecLengthUsed; ++m){ | | |
| aVal[i][m] = (VecVal / 128.0) − 1.0; | 8 | uimsbf |
| } | | |
| else if(NbitsQ(k)[i] >= 6) { | | |
| for (m=0; m< VVecLengthUsed; ++m){ | | |
| huffIdx = huffSelect(VVecCoeffIdUsed[m], PFlag[i], CbFlag[i]); | | |
| cid = huffDecode(NbitsQ[i], huffIdx, huffVal); | dynamic | huffDecode |
| aVal[i][m] = 0.0; | | |
| if ( cid > 0 ) { | | |
| aVal[i][m] = sgn = (sgnVal * 2) − 1; | 1 | bslbf |
| if (cid > 1) { | | |
| aVal[i][m] = sgn * (2.0^(cid −1 ) + intAddVal); | cid-1 | uimsbf |
| } | | |
| } | | |
| } | | |
| } | | |
| } | | |

NOTE:
See 0 for computation of VVecLength

TABLE 7

Syntax of HOAPredictionInfo(DirSigChannelIds, NumOfDirSigs)

| Syntax | No. of bits | Mnemonic |
|---|---|---|
| HOAPredictionInfo( ) | | |
| { | | |
| if(SingleLayer == 1){ | | |
| PredIdsBits = ceil( log2( NumOfDirSigs + 1 ) ); | | |
| } | | |
| else{ | | |
| PredIdsBits = ceil( log2(NumOfDirSigsPerLayer[lay] + 1 ) ); | | |
| } | | |
| if(PSPredictionActive){ | 1 | bslbf |
| NumActivePred = 0; | | |
| if(Kind OfCodedPredIds){ | 1 | bslbf |
| NumActivePred = NumActivePredIds + 1; | NumActive-PredIdsBits | uimsbf |
| i=0; | | |
| while( i < NumActivePred){ | | |
| PredIds[i] = PredIds[i] + 1; | ActivePred-IdsBits | uimsbf |
| i+++; | | |
| } | | |
| } | | |
| else { | | |
| for (i=0; i<(HoaOrder +1)^2; i++) { | | |
| if(ActivePred[i]) { | 1 | bslbf |
| NumActivePred ++; | | |
| } | | |
| } | | |
| } | | |
| NumOfGains=0; | | |
| for (i=0; i<NumActivePred * MaxNoOfDirSigsForPrediction; i++) { | | |

TABLE 7-continued

| Syntax of HOAPredictionInfo(DirSigChannelIds, NumOfDirSigs) | | |
|---|---|---|
| Syntax | No. of bits | Mnemonic |
| if (PredDirSigIds[i] > 0) { | PredIdsBits | uimsbf |
| PredDirSigIds[i] = | | |
| DirSigChannelIds[PredDirSigIds[i] − 1]; | | |
| NumOfGains++; | | |
| } | | |
| } | | |
| n=0; | | |
| for (i=0; i< NumOfGains; i++) { | | |
| if (PredDirSigIds[i]>0) { | | |
| PredGains[n]; | NoOfBitsPer-Scalefactor | bslbf |
| n++; | | |
| } | | |
| } | | |
| } | | |
| } | | |

TABLE AMD1.2

| Syntax of HOADirectionalPredictionInfo( ) | | |
|---|---|---|
| Syntax | No. of bits | Mnemonic |
| HOADirectionalPredictionInfo ( ) | | |
| { | | |
| if( UseDirectionalPrediction ) { | 1 | bslbf |
| if (!hoaIndependencyFlag) { | | |
| KeepPreviousGlobalPredDirsFlag; | 1 | bslbf |
| } | | |
| else{ | | |
| KeepPreviousGlobalPredDirsFlag = 0; | | |
| } | | |
| if( !KeepPreviousGlobalPredDirsFlag) { | | |
| NumOfGlobalPredDirs = NumOfGlobalPredDirs + 1; | MaxNumOf-PredDirsLog2 | bslbf |
| NumBitsForRelDirGridIdx = ceil( | | |
| log2( NumOfGlobalPredDirs ) ); | | |
| for ( idx=0; idx < NumOfGlobalPredDirs; idx++) { | | uimsbf |
| GlobalPredDirsIds[idx]; | NumOfBits-PerDirIdx | |
| } | | |
| } | | |
| else { | | |
| /* Keep values from previous HOADirectionalPredictionInfo payload for NumOfGlobalPredDirs and GlobalPredDirsIds. * / | | |
| } | | |
| if(SingleLayer==1){ | | |
| SortedAddHoaCoeff = sort(AddHoaCoeff, 'ascend'); | | |
| NumOfAddHoaChansUsed = NumOfAddHoaChans; | | |
| } | | |
| else{ | | |
| SortedAddHoaCoeff = sort(AddHoaCoeffPerLayer[lay], 'ascend'); | | |
| NumOfAddHoaChansUsed = NumOfAddHoaChansPerLayer[lay]; | | |
| } | | |
| for ( band = 0; band < NumOfPredSubbands; band++ ) { dir++) { | | |
| for ( hoaIdx = 0; | | |
| hoaIdx < MinNumOfCoeffsForAmbHOA; | | |
| hoaIdx++ ) { | | |
| DecodedMagDiff[band][dir][hoaIdx] = 0; | | |
| DecodedAngleDiff[band][dir][hoaIdx] = 0; | | |
| } | | |
| } | | |
| } | | |
| for ( band = 0; band < NumOfPredSubbands; band++ ) { | | |

TABLE AMD1.2-continued

Syntax of HOADirectionalPredictionInfo( )

| Syntax | No. of bits | Mnemonic |
|---|---|---|
| if (!hoaIndependencyFlag) { | | |
| KeepPreviousDirPredMatrixFlag[band]; | 1 | bslbf |
| } | | |
| else{ | | |
| KeepPreviousDirPredMatrixFlag[band] = 0; | | |
| } | | |
| if (!KeepPreviousDirPredMatrixFlag[band]) { | | |
| UseHuffmanCodingDiffMag; | 1 | bslbf |
| if( band < FirstSBRSubbandIdx ) { | 1 | bslbf |
| UseHuffmanCodingDiffAngle; | | |
| for ( dir = 0; dir < MaxNumOfPredDirsPerBand; dir++) { | | |
| if ( DirIsActive[band][dir] ) { | 1 | bslbf |
| RelDirGridIdx; | NumBitsFor-RelDirGridIdx | uimsbf |
| PredDirGridIdx[band][dir] = GlobalPredDirsIds[RelDirGridIdx]; | | |
| for ( hoaIdx = 0; | | |
| hoaIdx < MinNumOfCoeffsForAmbHOA; | | |
| hoaIdx++ ) { | | |
| readDirPredDiffValues (band, dir, hoaIdx, | | |
| UseHuffmanCodingDiffAbs, | | |
| UseHuffmanCodingDiffAngle, | | |
| FirstSBRSubbandIdx); | | |
| } | | |
| for ( idx = 0; | | |
| idx < NumOfAddHoaChansUsed; | | |
| idx++ ) { | | |
| readDirPredDiffValues (band, dir, | | |
| SortedAddHoaCoeff[idx] −1, | | |
| UseHuffmanCodingDiffAbs, | | |
| UseHuffmanCodingDiffAngle, | | |
| FirstSBRSubbandIdx); | | |
| } | | |
| } | | |
| } | | |
| } | | |
| } | | |
| } | | |
| } | | |

Note:
lay is the index of the currently active HOA enhancement layer

TABLE 8

SingleLayer definition

| Value | Meaning |
|---|---|
| 0 | HOA signal is provided in multiple layers; enables the signaling of the distribution of the HOA transport channels into the different layers |
| 1 | HOA signal is provided in a single layer |

| | |
|---|---|
| codedLayerCh | This element indicates for the first (i.e. base) layer the number of included transport signals, which is given by codedLayerCh + MinNumOfCoeffsForAmbHOA. For the higher (i.e enhancement) layers, this element indicates the number of additional signals included into an enhancement layer compared to the next lower layer, which is given by codedLayerCh + 1. |
| HOALayerChBits | This element indicates the number of bits for reading codedLayerCh. |
| NumLayers | This element indicates (after the reading of the HOADecoderConfig( )) the total number of layers within the bit stream. |

-continued

| | | |
|---|---|---|
| NumHOAChannelsLayer | | This element is an array consisting of NumLayers elements, of which the i-th element indicates the number of transport signals included in all layers up to the i-th layer. |
| 12.4.1.x | Frame and user dependent parameters | |
| $M_{LAY}(k)$ | | Number of all actually used layers for the k-th frame (to be specified) at the decoder side. In the case of layered coding (indicated by SingleLayer == 0) this number must be less or equal to the total number of layers present in the bit stream, i.e. $M_{LAY} \leq$ NumLayers. In the case of single-layered coding (indicated by SingleLayer == 1) $M_{LAY}$ is set to one. |

Dependent on the choice of $M_{LAY}(k)$ the number $I_{ADD,LAY}(k)$ of additional transport channels actually used for spatial HOA decoding (i.e. additional to the $O_{MIN}$ channels that are implicitely always used) is computed as follows:

```
if(SingleLayer | (!SingleLayer & M_LAY(k) == NumLayers))
{
   I_ADD, LAY (k) = NumOfAdditionalCoders;
}
else
{
   I_ADD, LAY (k) = NumHOACannelsLayer[M_LAY(k) − 1] -
MinNumOfCoeffsForAmbHOA;
}
```

VVecLength and VVecCoeffId

The codedVVecLength word indicates:

0) Complete vector length (NumOfHoaCoeffs elements). Indicates that all of the coefficients for the predominant vectors (NumOfHoaCoeffs) are specified.

1) Vector elements 1 to MinNumOfCoeffsForAmbHOA and all elements defined in ContAddHoaCoeff [lay] of the currently active layer of index lay=0 . . . NumLayers-1 are not transmitted. For the single layer mode SingleLayer=1 the variable NumLayers has to be set equal to one. Indicates that only those coefficients of the predominant vector corresponding to the number greater than a MinNumOfCoeffsForAmbHOA are specified. Further those NumOfContAddAmbHoaChan[lay] coefficients identified in ContAddAmbHoaChan[lay] are subtracted. The list ContAddAmbHoaChan[lay] specifies additional channels corresponding to an order that exceeds the order MinAmbHoaOrder.

2) Vector elements 1 to MinNumOfCoeffsForAmbHOA are not transmitted. Indicates that those coefficients of the predominant vectors corresponding to the number greater than a MinNumOfCoeffsForAmbHOA are specified.

In case of codedVVecLength=1 both the VVecLength[i] array as well as the VVecCoeffId[i][m] 2D array are valid for the VVector of index i, in the other cases both the VVecLength element as well as the VVecCoeffId [m] array are valid for all VVector within the HOAFrame. For the assignment algorithm below a helper function is defined as follows. switch CodedVVecLength { case 0:

```
  VVecLength = NumOfHoaCoeffs;
  for (m=0; m<VVecLength; ++m) {
     VVecCoeffId[m] = m;
  }
     break;
  case 1:
     for (i=0; i < NumOfVecSigs; ++i) {
        lay = VecSigLayerIdx[i];
        VVecLength[i] = NumOfHoaCoeffs
           -.MinNumOfCoeffsForAmbHOA
           - NumOfContAddHoaChans[lay];
        CoeffIdx = MinNumOfCoeffsForAmbHOA+1;
        for (m=0; m<VVecLength[i]; ++m) {
           bIsInArray = isMemberOf(CoeffIdx,
              ContAddHoaCoeff[lay],
              NumOfContAddHoaChans[lay]);
           while (bIsInArray) {
              CoeffIdx++;
              bIsInArray = isMemberOf(CoeffIdx,
                 ContAddHoaCoeff[lay],
                 NumOfContAddHoaChans[lay]);
           }
           VVecCoeffId[i][m] = CoeffIdx−1;
        }
     }
     break;
  case 2:
     VVecLength = NumOfHoaCoeffs − MinNumOfCoeffsForAmbHOA;
     for (m=0; m< VVecLength; ++m) {
        VVecCoeffId[m] = m + MinNumOfCoeffsForAmbHOA;
     }
}
```

The first switch statement with the three cases (cases 0-2) thus provides a way by which to determine the predominant vector length in terms of the number (VVecLength) and indices of coefficients (VVecCoeffId).

12.4.1.X Conversion to VVec element

The kind of dequantization of the V-vector is signalled by the word NbitsQ. The NbitsQ value of 4 indicates vector-quantization. When NbitsQ equals 5, a uniform 8 bit scalar dequantization is performed. In contrast, an NbitsQ value of greater or equal to 6 indicates the application of Huffman decoding of a scalar-quantized V-vector. The prediction mode is denoted as the PFlag, while the CbFlag represents a Huffman Table information bit.

```
if (CodedVVecLength == 1) {
   VVecLengthUsed = VVecLength[i];
   VVecCoeffIdUsed = VVecCoeffId[i];
} else {
```

-continued

```
    VVecLengthUsed = VVecLength;
    VVecCoeffIdUsed = VVecCoeffId;
  }
  if (NbitsQ(k)[i] == 4) {
    if (Num VvecIndices == 1) {
      for (m=0; m< VVecLengthUsed; ++m) {
        idx = VVecCoeffIdUsed[m];
        v^(i)_idx(k) = WeightVal[0] * VecDict[900].[VvecIdx[0][idx];
      }
    } else {
      cdbLen = O;
      if (N == 4) {
        cdbLen = 32;
      }
      for (m=0; m<O; ++m) {
        TmpVVec[m] = 0;
        for (j=0; j< NumVvecIndices; ++j) {
          TmpVVec[m] += WeightVal[j] * VecDict[cdbLen].[VvecIdx[j][m];
        }
      }
      FNorm = 0.0;
      for (m=0; m<O; ++m) {
        FNorm += TmpVVec[m] * TmpVVec[m];
      }
      FNorm = (N+1)/sqrt(FNorm);
      for (m=0; m< VVecLengthUsed; ++m) {
          idx = VVecCoeffIdUsed[m];
            v^(i)_idx(k)= TmpVVec[idx] * FNorm;
    }
    }
  }
  elseif (NbitsQ(k)[i] == 5) {
    for (m=0; m< VVecLengthUsed; ++m) {
          v^(i)_VVecCoeffIdUsed[m](k) =        (N+1)*aVal[i][m];
    }
  }
  elseif (NbitsQ(k)[i] >= 6) {
    for (m=0; m< VVecLengthUsed; ++m) {
      v^(i)_VVecCoeffIdUsed[m](k) = (N + 1) * (2^(16 - NbitsQ(k)[i])*aVal[i][m])/2^15;
      if (PFlag(k)[i] == 1) {
          v^(i)_VVecCoeffIdUsed[m](k) += v^(i)_VVecCoeffIdUsed[m] (k - 1);
      }
    }
  }
```

The invention claimed is:

1. A method of decoding a compressed Higher Order Ambisonics (HOA) representation of a sound or sound field, the method comprising:

receiving a bit stream comprising the compressed HOA representation, wherein the bit stream comprises a plurality of hierarchical layers that comprise a base layer and one or more hierarchical enhancement layers, determining a highest usable layer among the plurality of hierarchical layers for decoding;

determining that a parameter CodedVVecLength=0, and based on this determination determining that all of coefficients for predominant vectors (NumOfHoaCoeffs) are specified;

extracting a HOA extension payload assigned to the highest usable layer, wherein the HOA extension payload includes side information for parametrically enhancing a reconstructed HOA representation corresponding to the highest usable layer, wherein the reconstructed HOA representation corresponding to the highest usable layer is based on of transport signals assigned to the highest usable layer and any layers lower than the highest usable layer;

decoding the compressed HOA representation corresponding to the highest usable layer based on layer information, wherein the layer information indicates an active enhancement layer, and wherein the active enhancement layer can be used to determine a number of active directional signals in a current frame of the active enhancement layer; and parametrically enhancing the decoded HOA representation using the side information included in the HOA extension payload assigned to the highest usable layer.

2. The method of claim 1, wherein the layer information includes enhancement information that includes at least one of Spatial Signal Prediction, Sub-band Directional Signal Synthesis and Parametric Ambience Replication Decoder.

3. The method of claim 1, further including v-vector elements that are not transmitted for indices that are equal to indices of additional HOA coefficients included in a set of ContAddHoaCoeff.

4. The method of claim 1, wherein the layer information includes NumLayers elements, where each element indicates a number of the transport signals included in all layers up to an i-th layer.

5. The method of claim 1, wherein the layer information includes an indicator of all actually used layers for a k-th frame.

6. A non-transitory carrier medium carrying computer executable code that, when executed on a processor, causes the processor to perform a method according to claim 1.

7. An apparatus for decoding a compressed Higher Order Ambisonics (HOA) representation of a sound or sound field, the apparatus comprising:

a receiver configured to receive a bit stream comprising the compressed HOA representation, wherein the bit stream comprises a plurality of hierarchical layers that comprise a base layer and one or more hierarchical enhancement layers, a decoder configured to:

determine a highest usable layer among the plurality of hierarchical layers for decoding;

determine that a parameter CodedVVecLength=0, and based on this determination determining that all of coefficients for predominant vectors (NumOfHoaCoeffs) are specified;

extract a HOA extension payload assigned to the highest usable layer, wherein the HOA extension payload includes side information for parametrically enhancing a reconstructed HOA representation corresponding to the highest usable layer, wherein the reconstructed HOA representation corresponding to the highest usable layer is based on transport signals assigned to the highest usable layer and any layers lower than the highest usable layer;

decode the compressed HOA representation corresponding to the highest usable layer based on layer information, wherein the layer information indicates an active enhancement layer, and wherein the active enhancement layer can be used to determine a number of active directional signals in a current frame of the active enhancement layer; and parametrically enhance the decoded HOA representation using the side information included in the HOA extension payload assigned to the highest usable layer.

* * * * *